(12) United States Patent
Speer et al.

(10) Patent No.: US 12,458,576 B2
(45) Date of Patent: Nov. 4, 2025

(54) METHOD FOR REMOVING COLOR FROM ARTIFICIALLY COLORED HAIR

(71) Applicant: L'OREAL, Paris (FR)

(72) Inventors: Sarah Mary Speer, Linden, NJ (US); Shahid Mohammad Naseer, Hasbrouck Heights, NJ (US)

(73) Assignee: L'OREAL, Paris (FR)

( * ) Notice: Subject to any disclaimer, the term of this patent is extended or adjusted under 35 U.S.C. 154(b) by 329 days.

(21) Appl. No.: 17/936,431

(22) Filed: Sep. 29, 2022

(65) Prior Publication Data

US 2024/0122833 A1    Apr. 18, 2024

(51) Int. Cl.
| | | |
|---|---|---|
| *A61K 8/46* | (2006.01) | |
| *A61K 8/23* | (2006.01) | |
| *A61K 8/73* | (2006.01) | |
| *A61K 8/81* | (2006.01) | |
| *A61Q 5/08* | (2006.01) | |

(52) U.S. Cl.
CPC .................. *A61K 8/46* (2013.01); *A61K 8/23* (2013.01); *A61K 8/73* (2013.01); *A61K 8/8152* (2013.01); *A61K 8/8158* (2013.01); *A61Q 5/08* (2013.01); *A61K 2800/48* (2013.01); *A61K 2800/88* (2013.01)

(58) Field of Classification Search
CPC ... A61K 8/46; A61K 8/23; A61K 8/73; A61K 8/8152; A61K 8/8158; A61K 2800/48; A61K 2800/88; A61K 2800/882; A61K 8/731; A61Q 5/08
See application file for complete search history.

(56) References Cited

U.S. PATENT DOCUMENTS

| | | | |
|---|---|---|---|
| 2,921,380 A * | 1/1960 | Savet | |
| 6,106,579 A | 8/2000 | Kunz et al. | |
| 7,981,403 B2 | 7/2011 | Cannell et al. | |
| 10,653,598 B2 * | 5/2020 | Schoepgens et al. | ... A61K 8/36 |
| 11,154,479 B1 | 10/2021 | Zhang et al. | |
| 2008/0085249 A1 | 4/2008 | Cannell et al. | |
| 2010/0083977 A1 | 4/2010 | Goddard-Clark et al. | |
| 2017/0128334 A1 | 5/2017 | Schoepgens et al. | |
| 2017/0340549 A1 | 11/2017 | Anderheggen et al. | |
| 2017/0347771 A1 | 12/2017 | Schoepgens et al. | |
| 2018/0161261 A1 | 6/2018 | Gebert-Schwarzwaelder et al. | |
| 2018/0185257 A1 | 7/2018 | Shin et al. | |
| 2018/0263880 A1 | 9/2018 | Schoepgens et al. | |
| 2019/0269593 A1 | 9/2019 | Shin et al. | |
| 2021/0000793 A1 | 1/2021 | Sung et al. | |
| 2021/0369582 A1 | 12/2021 | Zhang et al. | |

FOREIGN PATENT DOCUMENTS

| | | |
|---|---|---|
| DE | 10118176 A1 | 10/2001 |
| DE | 102004050239 A1 | 5/2005 |
| DE | 102004045353 A1 | 4/2006 |
| DE | 102005041443 A1 | 3/2007 |
| DE | 102006053402 A1 | 5/2008 |
| DE | 102010054866 A1 | 8/2011 |
| DE | 102011085173 A1 | 7/2012 |
| DE | 102012201265 A1 | 8/2013 |
| DE | 102014213317 A1 | 1/2016 |
| EP | 1300136 A2 | 4/2003 |
| EP | 1977732 A1 | 10/2008 |
| FR | 2811888 A1 | 1/2002 |
| FR | 2811889 A1 | 1/2002 |
| FR | 3052054 A1 | 12/2017 |
| GB | 2564183 A | 1/2019 |
| WO | 2008055756 A1 | 5/2008 |
| WO | 2022008561 A1 | 1/2022 |

OTHER PUBLICATIONS

Preliminary Search Report and Written Opinion issued on Jun. 21, 2023 for corresponding French Application No. FR 2212401.
Database GNPD [Online]; Mintel; Anonymous: "Permanent Cold Wave Curly System," 2020 XP093055946.

* cited by examiner

*Primary Examiner* — Robert A Wax
*Assistant Examiner* — Kimberly Barber
(74) *Attorney, Agent, or Firm* — POLSINELLI PC

(57) ABSTRACT

The instant disclosure relates to methods for removing color from artificially colored hair. The methods include a two-step process: (I) applying a reducing composition to hair that has been colored with oxidation dyes and rinsing the reducing composition from the hair; and (II) applying an alkalizing composition to the hair and rinsing the alkalizing composition from the hair. The step can be carried out in either order. The methods effectively remove color from artificially hair in a quick and gentle manner without employing an oxidizing agent.

18 Claims, 12 Drawing Sheets

METHOD FOR REMOVING COLOR FROM ARTIFICIALLY COLORED HAIR

FIELD OF THE DISCLOSURE

The present disclosure relates to methods for removing color (oxidation dyes) from artificially colored hair using a two-step process.

BACKGROUND

Consumers enjoy cosmetic products that change the color of hair. Many consumers desire a permanent color change and therefore use products containing permanent dyes. Conventional permanent hair coloring products are dye compositions comprising oxidation dye precursors, which are also known as primary intermediates or couplers. Oxidation dye precursors are generally colorless or weakly colored compounds which, when combined with an oxidizing agent, give rise to colored complexes by a process of oxidative condensation. Peroxides such as hydrogen peroxide and persulfates are often used as the oxidizing agent. The coloring process allows small oxidative dye molecules to penetrate the cuticle and cortex of the hair fibers before the oxidation condensation process is completed. The resulting larger-sized colored complexes from the oxidative reaction are then trapped inside the hair fiber, thereby permanently altering the color of the hair.

Some consumers desire to quickly change hair colors, e.g., they color their hair with one color and change to another color before the first color has naturally washed out. Before applying the new color to the hair, the existing color needs to be removed with a color removing product. Most color removal products rely on an oxidation process (they bleach the hair). This process, however, tends to damage hair fibers, especially when carried out multiple times in short duration. When hair is colored, not all oxidative dye precursors react with the oxidizing agent. A small number of residual oxidative dye precursors become lodged in the hair. When the hair is later treated with a hair color removal product, the oxidizing agent in the hair color removal product reacts with the residual oxidative dye precursors, causing the color to be removed from the hair to reappear. Therefore, methods to effectively remove color from artificially hair in a quick and gentle manner are needed.

SUMMARY OF THE DISCLOSURE

The methods and compositions described herein are useful for removing color and for removing oxidative dyes (reacted and unreacted oxidative dyes) from the hair in an effective and gentle manner. The methods entail to two-step procedure. One step involves treating artificially colored hair with a reducing composition. The other step involves treating the artificially colored hair with an alkalizing composition. The hair can be treated with the reducing composition before treatment with the alkalizing composition or the order can be reversed. Preferably, however, the hair is first treated with a reducing composition and subsequently treated with an alkalizing treatment. The methods are unique because they do not require treating the hair with an oxidizing agent (or composition comprising an oxidizing agent) such as hydrogen peroxide or a persulfate. Treating the hair with only the reducing composition or only the alkalizing composition slightly removes or lifts some color from the artificially colored hair. When the two treatments are used together, however, the degree of color removal is surprisingly high and beyond what would be expected based the sum of the two individual steps (it greater than additive).

The methods of the instant disclosure for removing color from artificially colored hair, include:
- (I) applying a reducing composition to hair that has been colored with oxidation dyes, the reducing composition comprising:
  - (a) one or more sulfur-containing reducing agents; and
  - (b) water;
    - wherein the reducing composition is free from oxidative dye precursors;
- (II) rinsing the reducing composition from the hair and optionally shampooing the hair;
- (III) applying an alkalizing composition to the hair, the alkalizing composition comprising:
  - (a) one or more organic alkalizing agents; and
  - (b) water; and
- (IV) rinsing the reducing composition from the hair and optionally shampooing the hair.

Steps (I) and (II) can be carried out before (III) and (IV), or (III) and (IV) can be carried out before (I) and (II). The method does not require treating the hair with oxidizing agents, for example, peroxides and persulfates. Furthermore, the method preferably does not require ammonia or ammonia-generating agents.

Nonlimiting examples of sulfur-containing reducing agents include alkaline-earth metal sulfites, ammonia sulfites, thiol-based compounds, salt thereof, and a combination thereof. Nonlimiting examples of thiol-based compounds include thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and mixtures thereof.

In various embodiments, the reducing composition includes one or more surfactants, for example, one or more anionic surfactants, nonionic surfactants, or a combination thereof.

In various embodiments, the reducing composition includes one or more thickening agents. Nonlimiting examples of thickening agents include polyacrylate crosspolymers including crosslinked polyacrylate polymers, cationic acrylate copolymers, anionic acrylic or carboxylic acid polymers, polyacrylamide polymers, polysaccharides, gums, polyquaterniums, vinylpyrrolidone homopolymers/copolymers, C8-24 hydroxyl substituted aliphatic acid, C8-24 conjugated aliphatic acid, sugar fatty esters, polyglyceryl esters, and a mixture thereof. In further embodiments, one or more of the thickening agents is a natural thickening agent. Nonlimiting examples of natural thickening agents include celluloses, gums (e.g., xanthan gum), and a mixture thereof.

In various embodiments, one or more of the organic alkalizing agents in the alkalizing composition is an alkanolamine. Nonlimiting examples of alkanolamines include monoethanolamine, diethanolamine, triethanolamine, monopropanolamine, dipropanolamine, tripropanolamine, 2-amino-2-methyl-1,3-propanediol, 2-amino-2-methyl-1-propanol, and 2-amino-2-hydroxymethyl-1,3-propanediol, and a combination thereof.

In various embodiments, the alkalizing composition is transparent or translucent.

The instant disclosure also relates to a kit comprising a reducing composition and an alkalizing composition a disclosed herein. For example, a kit comprising:
(A) a reducing composition comprising:
 (a) one or more sulfur-containing reducing agents;
 (b) water;
  wherein the reducing composition is free from oxidative dye precursors; and
(B) an alkalizing composition comprising:
 (a) one or more organic alkalizing agents; and
 (b) water;
  wherein the reducing composition (A) and the alkalizing composition (B) are separately contained.

It is to be understood that both the foregoing general description and the following detailed description are exemplary and explanatory only, and are not restrictive of the disclosure.

Other subjects, characteristics, aspects and advantages of embodiments of the disclosure will emerge even more clearly on reading the description and the various examples that follow.

BRIEF DESCRIPTION OF THE DRAWINGS

Implementations of the present technology will now be described, by way of example, with reference to the attached figures, wherein.

Figure 1:
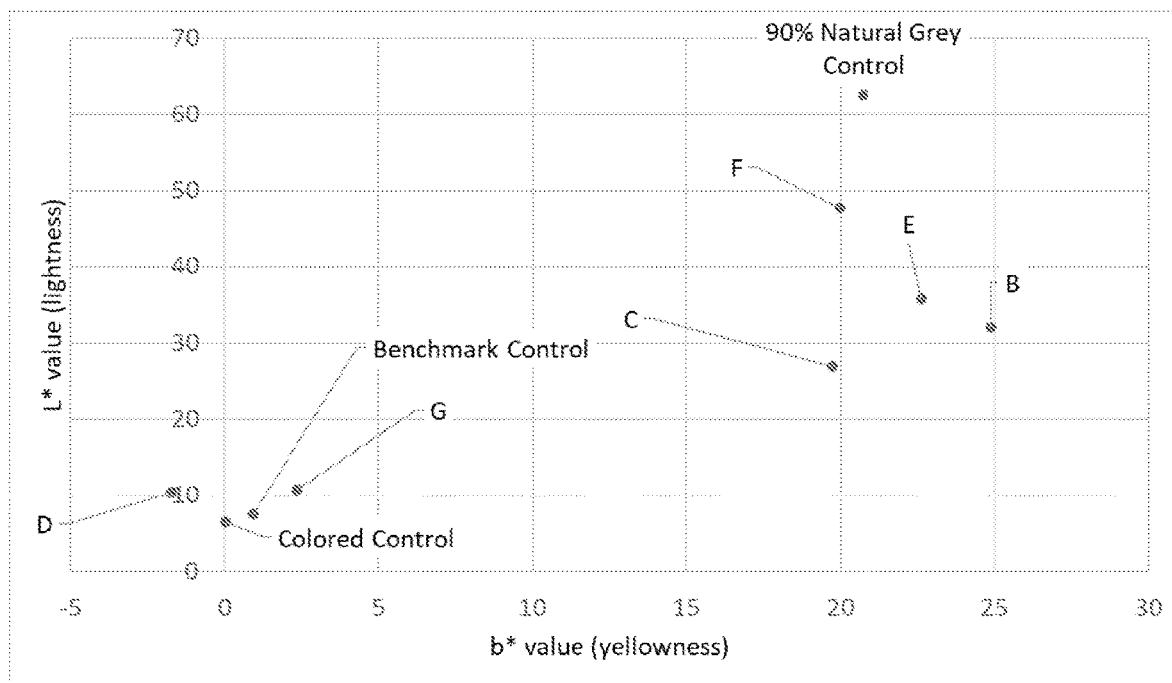
FIG. 1 is a graph showing L* versus b* values for 90% grey hair that was colored and subsequently treated with a reducing composition.

The figures and the data they represent are nonlimiting and are provided merely to illustrate certain aspects of the technology.

DETAILED DESCRIPTION

Individuals often seek to remove color from artificially colored hair, for example, hair that has been colored based on oxidative dying technology. The reasons for removing the color vary. The coloring process may have provided inadequate color deposition, or the original color has faded over time. As color fades, the hair can appear less vibrant, exhibit unwanted color tones, and look unkept. Alternatively, the individual may merely want to change the color of the hair. Regardless, before re-coloring artificially colored hair, the oxidation dyes and residual oxidative dye precursors lodged in the hair should be removed. The compositions and methods of the instant disclosure effectively remove color (e.g., oxidation dyes and oxidative dye precursors) from artificially hair in a quick and gentle manner.

In various embodiments, method for removing color (oxidation dyes and/or oxidative dye precursors) from oxidatively colored hair comprise or consist of:
(I) applying a reducing composition to hair that has been colored with oxidation dyes, the reducing composition comprising:
 (a) one or more sulfur-containing reducing agents; and
 (b) water;
  wherein the reducing composition is free from oxidative dye precursors;
(II) rinsing the reducing composition from the hair and optionally shampooing the hair;
(III) applying an alkalizing composition to the hair, the alkalizing composition comprising:
 (a) one or more organic alkalizing agents; and
 (b) water; and
(IV) rinsing the reducing composition from the hair and optionally shampooing the hair;
 wherein (I) and (II) can be carried out before (III) and (IV), or (III) and (IV) can be carried out before (I) and (II).

The method does not require treating the hair with oxidizing agents, for example, peroxides or persulfates. Furthermore, the method preferably does not require ammonia or ammonia-generating agents. Ammonia has a distinct odor that many consumers find objectionable.

(A) Reducing Composition and Method for Treating Hair

Nonlimiting examples of sulfur-containing reducing agents include alkaline-earth metal sulfites, ammonia sulfites, thiol-based compounds, salt thereof, and a combination thereof. Nonlimiting examples of thiol-based compounds include thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and mixtures thereof. In various embodiments the one or more sulfur-containing reducing agents are selected from alkaline-earth metal sulfites. A particularly preferred alkaline-earth metal sulfite is sodium metabisulfite.

In various embodiments, the one or more sulfur-containing reducing agent is selected from sodium metabisulfite, thiolactic acid, ammonium thioglycolate, thioglycolic acid, calcium thioglycolate, salts thereof, and a combination thereof.

The amount of the sulfur-containing reducing agents will vary. Nonetheless, in various embodiments, the reducing composition comprises about 2 to about 35 wt. % of the one or more sulfur-containing reducing agents. In further embodiments, the reducing composition comprises from about 2 to about 30 wt. %, about 2 to about 25 wt. %, about 2 to about 20 wt. %, about 2 to about 15 wt. %, about 3 to about 35 wt. %, about 3 to about 30 wt. %, about 3 to about 25 wt. %, about 3 to about 20 wt. %, about 3 to about 15 wt. %, about 5 to about 35 wt. %, about 5 to about 30 wt. %, about 5 to about 25 wt. %, about 5 to about 20 wt. %, about 5 to about 15 wt. %, about 10 to about 35 wt. %, about 10 to about 30 wt. %, about 10 to about 25 wt. %, or about 10 to about 20 wt. % of the one or more sulfur-containing reducing agents, based on the total weight of the reducing composition.

In various embodiments, the reducing composition preferably includes sodium metabisulfite. The amount of sodium metabisulfite in the reducing composition will vary but can be in an amount of about 2 to about 35 wt. %, based on the total weight of the reducing composition. In further embodiments, the amount of sodium metabisulfite in the reducing composition is about 3 to about 30 wt. %, about 3 to about 25 wt. %, about 3 to about 20 wt. %, about 5 to about 30 wt. %, about 5 to about 25 wt. %, about 5 to about 20 wt. %, about 10 to about 30 wt. %, about 10 to about 25 wt. %, or about 10 to about 20 wt. %, based on the total weight of the reducing composition.

In various embodiments, the reducing composition preferably includes thiolactic acid. The amount of thiolactic acid in the reducing composition will vary but can be in an amount of about 2 to about 30 wt. %, based on the total weight of the reducing composition. In further embodiments, the amount of thiolactic acid in the reducing composition is about 2 to about 25 wt. %, about 2 to about 20 wt. %, about 2 to about 15 wt. %, about 3 to about 30 wt. %, about 3 to about 25 wt. %, about 3 to about 20 wt. %, about 3 to about 15 wt. %, about 5 to about 30 wt. %, about 5 to about 25 wt. %, about 5 to about 20 wt. %, about 5 to about 15 wt. %, or about 8 to about 12 wt. %, based on the total weight of the reducing composition.

In various embodiments, the reducing composition preferably includes ammonium thioglycolate. The amount of ammonium thioglycolate in the reducing composition will vary but can be in an amount of about 2 to about 35 wt. %, based on the total weight of the reducing composition. In further embodiments, the amount of ammonium thioglycolate in the reducing composition is about 3 to about 30 wt. %, about 3 to about 25 wt. %, about 3 to about 20 wt. %, about 5 to about 30 wt. %, about 5 to about 25 wt. %, about 5 to about 20 wt. %, about 10 to about 30 wt. %, about 10 to about 25 wt. %, or about 10 to about 20 wt. %, based on the total weight of the reducing composition.

In various embodiments, the reducing composition preferably includes thioglycolic acid. The amount of thioglycolic acid in the reducing composition will vary but can be in an amount of about 2 to about 30 wt. %, based on the total weight of the reducing composition. In further embodiments, the amount of thioglycolic acid in the reducing composition is about 2 to about 25 wt. %, about 2 to about 20 wt. %, about 2 to about 15 wt. %, about 3 to about 30 wt. %, about 3 to about 25 wt. %, about 3 to about 20 wt. %, about 3 to about 15 wt. %, about 5 to about 30 wt. %, about 5 to about 25 wt. %, about 5 to about 20 wt. %, about 5 to about 15 wt. %, or about 8 to about 12 wt. %, based on the total weight of the reducing composition.

In various embodiments, the reducing composition preferably includes calcium thioglycolate. The amount of calcium thioglycolate in the reducing composition will vary but can be in an amount of about 2 to about 25 wt. %, based on the total weight of the reducing composition. In further embodiments, the amount of calcium thioglycolate in the reducing composition is about 2 to about 20 wt. %, about 2 to about 15 wt. %, about 2 to about 10 wt. %, about 2 to about 8 wt. %, about 3 to about 20 wt. %, about 3 to about 15 wt. %, about 3 to about 10 wt. %, or about 3 to about 8 wt. %, based on the total weight of the reducing composition.

In various embodiments, the sulfur-containing reducing agent in the reducing composition is not sodium sulfite, ammonium thiolactate, or sodium thiosulfate. In other words, in various embodiments, the reducing composition can be free or essentially free from sodium sulfite, ammonium thiolactate, and/or sodium thiosulfate. If included in the reducing composition, it is preferably that an additional sulfur-containing reducing agent be included with the sodium sulfite, ammonium thiolactate, and/or sodium thiosulfate. Sodium sulfite, ammonium thiolactate, and sodium thiosulfate provide reducing activity but are not as effective at removing coloring from artificially colored has as other sulfur-containing reducing agents.

The amount of water in the reducing composition will vary. Nonetheless, in various embodiments, the reducing composition include about 50 to about 95 wt. % of water. In further embodiments, the reducing composition includes about 55 to about 95 wt. %, about 60 to about 95 wt. %, about 65 to about 95 wt. %, about 70 to about 95 wt. %, about 75 to about 95 wt. %, about 80 to about 95 wt. %, about 50 to about 93 wt. %, about 55 to about 93 wt. %, about 60 to about 93 wt. %, about 65 to about 93 wt. %, about 70 to about 93 wt. %, about 75 to about 93 wt. %, about 80 to about 93 wt. %, about 55 to about 90 wt. %, about 60 to about 90 wt. %, about 65 to about 90 wt. %, about 70 to about 90 wt. %, about 75 to about 90 wt. %, or about 80 to about 90 wt. %, based on the total weight of the reducing composition.

In various embodiments, the reducing composition includes one or more surfactants, for example, one or more anionic surfactants, nonionic surfactants, cationic surfactants, and/or amphoteric (zwitterionic) surfactants. In a preferred embodiment, the reducing composition includes one or more anionic surfactants. In a preferred embodiment, the reducing composition includes one or more nonionic surfactants. In another preferred embodiment, the reducing compositions includes one or more anionic surfactants and one or more nonionic surfactants. In other embodiments, the reducing composition is free or essentially free from surfactants. More specifically, in various embodiments, the reducing composition is free or essentially free from cationic surfactants. In other embodiments, the reducing composition is free or essentially free from amphoteric (zwitterionic) surfactants. In further embodiments, the reducing composition is free or essentially free from nonionic surfactants.

The total amount of the one or more surfactants in the reducing composition will vary. Nonetheless, in various embodiments the reducing composition includes about 0.1 to about 10 wt. % of the one or more surfactants. In further embodiments, the reducing composition includes about 0.1 to about 8 wt. %, about 0.1 to about 6 wt. %, about 0.1 to about 5 wt. %, about 0.1 to about 4 wt. %, about 0.5 to about 10 wt. %, about 0.5 to about 8 wt. %, about 0.5 to about 6 wt. %, about 0.5 to about 5 wt. %, about 0.5 to about 4 wt. %, about 1 to about 10 wt. %, about 1 to about 8 wt. %, about 1 to about 6 wt. %, about 1 to about 5 wt. %, or about 1 to about 4 wt. % of the one or more surfactants.

As noted above, in various embodiments, the reducing composition includes one or more anionic surfactants.

Nonlimiting examples of anionic surfactants include alkyl carboxylic acids, alkyl ether carboxylic acids, alkyl phosphates, alkyl ether phosphates, alkyl sulfates, alkyl ether sulfates, alkyl sulfonates, alkyl ether sulfonates, and salts thereof. In certain embodiments, the hair coloring base composition includes one or more alkyl ether carboxylic acids. Nonlimiting examples of alkyl ether carboxylic acids include ceteareth-2 carboxylic acid, ceteareth-10 carboxylic acid, coceth-7 carboxylic acid, laureth-4 carboxylic acid, laureth-5 carboxylic acid, laureth-6 carboxylic acid, myreth-2 carboxylic acid, myreth-3 carboxylic acid, myreth-4 carboxylic acid, myreth-5 carboxylic acid, myreth-6 carboxylic acid, steareth-2 carboxylic acid, steareth-4 carboxylic acid, steareth-5 carboxylic acid, steareth-6 carboxylic acid, oleth-2 carboxylic acid, oleth-4 carboxylic acid, and mixtures and/or salts thereof.

Preferred anionic surfactants include:

Acyl sarcosinates containing 8 to 24 C atoms in the acyl group;

Acyl taurates containing 8 to 24 C atoms in the acyl group;

Acyl isethionates containing 8 to 24 C atoms in the acyl group;

Acyl glycinates containing 8 to 24 C atoms in the acyl group;

Acyl lactylates containing 8 to 24 C atoms in the acyl group;

Sulphosuccinic acid mono and/or dialkyl esters containing 8 to 24 C atoms in the alkyl group and sulphosuccinic acid monoalkyl polyoxyethylesters containing 8 to 24 C atoms in the alkyl group and 1 to 6 oxyethyl groups; and/or Alkyl sulfates and/or alkylether sulfate salts with formula R—$(OCH_2—CH_2)_n$—O—$SO_3X$, in which R preferably represents a linear or branched, saturated or unsaturated alkyl group containing 8 to 24 C atoms, x represents the number 0 or 1 to 12 and X represents an alkali, alkaline earth, ammonium or alkanolamine ion.

In a preferred embodiment, the reducing compositions includes one or more alkyl sulfates and/or alkylether sulfates. In another preferred embodiment, the reducing compositions include one or more acyl isethionates. In another preferred embodiment, the reducing composition include one or more alkyl sulfates, alkylether sulfate, acyl isethionates, or a combination thereof. In another embodiment, the reducing composition includes sodium lauryl sulfate and sodium lauroyl methyl isethionate.

Particularly preferred anionic surfactants include alkali, alkaline earth and/or ammonium salts of linear or branched, saturated or unsaturated alkyl sulfates, alkylether sulfates, acyl isethionates, acyl glycinates, acyl taurates, acyl sarcosinates, acyl lactylates and/or acyl sulphosuccinates, the alkyl or acyl groups of which respectively contain 6 to 24 carbon atoms. Particularly preferred anionic surfactants include compounds with the INCI names: sodium laureth sulfate, sodium myreth sulfate, sodium trideceth sulfate, sodium lauroyl lactylate, sodium stearoyl lactylate, sodium cocoyl isethionate, sodium methyl cocoyl isethionate, sodium cocoyl glycinate, sodium methyl cocoyl glycinate, sodium cocoyl taurate, sodium methyl cocoyl taurate, sodium myristoyl sarcosinate, sodium cocoyl sarcosinate, sodium tallowate, sodium palmate and/or sodium lardate, and a mixture thereof.

If present, the amount of the one or more anionic surfactants will vary. Nonetheless, in various embodiments, the reducing composition includes about 0.1 to about 10 wt. % of the one or more anionic surfactants. In further embodiments, the reducing composition includes about 0.1 to about 8 wt. %, about 0.1 to about 5 wt. %, about 0.1 to about 4 wt. %, about 0.5 to about 10 wt. %, about 0.5 to about 8 wt. %, about 0.5 to about 5 wt. %, about 0.5 to about 4 wt. %, about 1 to about 10 wt. %, about 1 to about 8 wt. %, about 1 to about 5 wt. %, or about 1 to about 4 wt. % of the one or more anionic surfactants.

In various embodiments, the reducing composition includes one or more nonionic surfactants. Nonlimiting examples of nonionic surfactants include oxyethylenated amides, oxyethylenated fatty alcohols, and block-copolymer (polycondensate) surfactants of ethylene oxide and of propylene oxide, and a mixture thereof. In a preferred embodiment, the hair coloring base composition includes PEG-4 rapeseedamide (an oxyethylenated amide), deceth-3 (an oxyethylenated fatty alcohol), poloxamer 338 (block-copolymer (polycondensate) surfactants of ethylene oxide and of propylene oxide), or a combination thereof.

Non-limiting examples of nonionic oxyethylenated amides are those of the following formula:

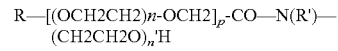

in which:

p denotes 0 or 1, n denotes a number ranging from 1 to 10 and preferably from 1 to 6, n' denotes a number ranging from 1 to 100 and preferably from 1 to 60, R' denotes a hydrogen atom or a CH2CH2OH radical and preferably a hydrogen atom, and R denotes a C10-C30 and preferably C12-C22 alkyl or alkenyl radical.

Examples of these compounds include AMIDET A15 sold by the company Kao (INCI name: Trideceth-2 carboxamide MEA), ETHOMID HP 60 sold by the company Akzo Nobel (INCI name: PEG-50 Hydrogenated Palmamide) and AMIDET N sold by the company Kao (INCI name: PEG-4 Rapeseedamide).

Non-limiting examples of fatty alcohols include saturated or unsaturated and linear or branched alcohols comprising from 6 to 30 carbon atoms and preferably from 8 to 30 carbon atoms, for instance, cetyl alcohol, isostearyl alcohol, stearyl alcohol and the mixture thereof (cetylstearyl alcohol), octyldodecanol, 2-butyloctanol, 2-hexyldecanol, 2-undecylpentadecanol, oleyl alcohol, linolenyl alcohol, ricinoleyl alcohol, undecylenyl alcohol and linoleyl alcohol, and mixtures thereof.

Non-limiting examples of oxyethylenated fatty alcohols include those comprising less than 10 OE units, preferably chosen from oxyethylenated derivatives of saturated or unsaturated, linear or branched, preferably linear, $C_8$-$C_{30}$ and preferably $C_{12}$-$C_{22}$ fatty alcohols, for instance cetyl alcohol, oleyl alcohol, oleocetyl alcohol, lauryl alcohol, behenyl alcohol, cetearyl alcohol, stearyl alcohol and isostearyl alcohol, and mixtures thereof.

As oxyethylenated fatty alcohols comprising less than 10 OE units, mention may be made of oxyethylenated fatty alcohols comprising from 2 to 8 and preferably from 2 to 6 OE units, for instance products of addition of ethylene oxide and lauryl alcohol, for instance lauryl alcohol 2 OE (CTFA name: laureth-2), products of addition of ethylene oxide and stearyl alcohol, for instance stearyl alcohol 2 OE (CTFA name: steareth-2), products of addition of ethylene oxide and decyl alcohol, for instance decyl alcohol 3 OE (CTFA name: deceth-3), decyl alcohol 5 OE (CTFA name: deceth-5), products of addition of ethylene oxide and oleocetyl alcohol, for instance oleocetyl alcohol 5 OE (CTFA name: oleoceteth-5), and mixtures thereof. In some instances, deceth-3 may be particularly useful.

Furthermore, non-limiting examples of oxyethylenated fatty alcohols having an average degree of ethoxylation of 2 to 29 are, for example, laureth-2, oleth-2, ceteareth-2, laneth-2, laureth-3, oleth-3, ceteareth-3, laureth-4, oleth-4, ceteareth-4, laneth-4, laureth-5, oleth-5, ceteareth-5, laneth-5, deceth-4, deceth-7, laureth-7, oleth-7, coceth-7, ceteth-7, ceteareth-7, C11-15 pareth-7, laureth-9, oleth-9, ceteareth-9, laureth-10, oleth-10, beheneth-10, ceteareth-10, laureth-12, ceteareth-12, trideceth-12, ceteth-15, laneth-15, ceteareth-15, laneth-16, ceteth-16, oleth-16, steareth-16, oleth-20, ceteth-20, ceteareth-20, laneth-20, steareth-21, ceteareth-23, ceteareth-25, ceteareth-27, and a mixture thereof.

Mention may be made, as block-copolymer (polycondensate) surfactant of ethylene oxide and of propylene oxide which may be used, of the polyethylene glycol/polypropylene glycol/polyethylene glycol triblock polycondensates sold under the "SYNPERONIC" names, such as "SYNPERONIC PE/F32" (INCI name: Poloxamer 108), "SYNPERONI. PE/F108" (INCI name: Poloxamer 338), "SYNPERONIC PE/L44" (INCI name: Poloxamer 124), "SYNPERONIC PE/L42" (INCI name: Poloxamer 122), "SYNPERONIC PE/F127" (INCI name: Poloxamer 407), "SYNPERONIC PE/F88" (INCI name: Poloxamer 238) or "SYNPERONIC PE/L64" (INCI name: Poloxamer 184), by Croda or also "LUTROL F68" (INCI name: Poloxamer 188), sold by BASF. In some instances, Poloxamer 338 may be particularly useful.

A more exhaustive list of useful nonionic surfactants that may be included in the reducing composition is provided later, under the heading "Nonionic Surfactants."

When the reducing composition includes one or more nonionic surfactants, the amount of the one or more nonionic surfactants will vary. Nonetheless, in various embodiments, the reducing composition includes about 0.01 to about 10 wt. % of the one or more nonionic surfactants. In further embodiments, the reducing composition includes about 0.01 to about 8 wt. %, about 0.01 to about 5 wt. %, about 0.01 to about 3 wt. %, about 0.1 to about 10 wt. %, about 0.1 to about 8 wt. %, about 0.1 to about 5 wt. %, or about 0.1 to about 3 wt. % of the one or more nonionic surfactants.

In various embodiments, the reducing composition includes one or more thickening agents. The term "thickening agent" is interchangeable with the term "thickener." Nonlimiting examples of thickening agents include polyacrylate crosspolymers including crosslinked polyacrylate polymers, cationic acrylate copolymers, anionic acrylic or carboxylic acid polymers, polyacrylamide polymers, polysaccharides, gums, polyquaterniums, vinylpyrrolidone homopolymers/copolymers, C8-24 hydroxyl substituted aliphatic acid, C8-24 conjugated aliphatic acid, sugar fatty esters, polyglyceryl esters, and a mixture thereof. In a preferred embodiment, the reducing composition includes one or more natural thickening agents. Nonlimiting examples of natural thickening agents include polysaccharides such as glucans, modified and unmodified starches, amylose, amylopectins, dextrans, celluloses and their derivatives (methylcelluloses, hydroxyalkylcelluloses, ethylhydroxyethylcelluloses and carboxymethylcelluloses), mannans, xylans, lignins, chitin, chitosans, pectins, alginic acids and alginates, arabinogalactans, carrageenans and carrageenates, agar, gums (arabicum, karaya), carob bean gum, galactomannans such as guar gum and non-ionic derivatives (hydroxypropyl guar), xanthan gum, scleroglucan, and mixtures thereof. In a preferred embodiment, the reducing composition includes xanthan gum.

A more exhaustive list of useful thickening agents that may be included in the reducing composition is provided later, under the heading "Thickening agents."

The amount of the one or more thickening agents in the reducing composition will vary. Nonetheless, in various embodiments, the reducing composition includes about 0.1 to about 10 wt. % of the one or more thickening agents. In further embodiments, the reducing composition includes about 0.1 to about 8 wt. %, about 0.1 to about 5 wt. %, 0.1 to about 4 wt. %, about 0.1 to about 3 wt. %, about 0.5 to about 10 wt. %, about 0.5 to about 8 wt. %, about 0.5 to about 5 wt. %, about 0.5 to about 4 wt. %, or about 0.5 to about 3 wt. %, based on the total weight of the reducing composition.

In various embodiments, the reducing composition includes one or more water-soluble organic solvents (or simply "water-soluble solvents"). The term "water-soluble organic solvent" (or "water-soluble solvent") is interchangeable with the term "water-miscible solvent" and means an organic compound that is liquid at 25° C. and at atmospheric pressure (760 mmHg), and it has a solubility of at least 50% in water under these conditions. In certain embodiments, the one or more water-soluble organic solvents have a solubility of at least 60%, 70%, 80%, or 90% in water at 25° C. and at atmospheric pressure (760 mmHg). Non-limiting examples of water-soluble organic solvents include glycerin, alcohols (for example, $C_{1-30}$, $C_{1-15}$, $C_{1-10}$, or $C_{1-4}$ alcohols), polyols, glycols, and a mixture thereof. In certain embodiments, the one or more water-soluble organic solvents are chosen from alcohols such as ethyl alcohol, isopropyl alcohol, propyl alcohol, benzyl alcohol, and phenylethyl alcohol, or glycols or glycol ethers such as monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol.

Further non-limiting but useful examples of water-soluble organic solvents include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, (caprylyl glycol), 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, sulfolane, and a mixture thereof.

In various embodiments, the reducing composition includes one or more water-soluble organic solvents chosen from glycols, $C_{1-4}$ alcohols, glycerin, and a mixture thereof; preferably the water-soluble organic solvent is chosen from caprylyl glycol, glycerin, ethanol, isopropyl alcohol, dipropylene glycol, propylene glycol, hexylene glycol, caprylyl glycol, propylene glycol, glycerin, ethanol, and a mixture thereof.

In certain embodiments, the reducing composition includes one or more polyhydric alcohols. Nonlimiting examples of polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, and a mixture thereof. Polyol compounds may also be used. Non-limiting examples include the aliphatic diols, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol, and a mixture thereof.

The total amount of the one or more water-soluble organic solvents in the reducing composition, if present, will vary. In various embodiments, the reducing composition includes about 1 to about 40 wt. % of the one or more water-soluble organic solvents, based on the total weight of the reducing composition. In further embodiments, the hair reducing composition includes about 0.1 to about 30 wt. %, about 0.1 to about 20 wt. %, about 0.1 to about 10 wt. %, about 0.1 to about 5 wt. %, about 1 to about 30 wt. %, about 1 to about 20 wt. %, about 1 to about 10 wt. %, about 1 to about 5 wt., based on the total weight of the reducing composition.

In various embodiments, the reducing composition includes one or more miscellaneous ingredients. Miscellaneous ingredients are ingredients that are compatible with the reducing composition and do not disrupt or materially affect the basic and novel properties of the compositions (e.g., the "reducing nature of the composition"). Nonlimiting examples of ingredients include preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, etc.

In various embodiments, the miscellaneous ingredients are chosen from preservatives, fragrances, pH adjusters, salts, chelating agents, buffers, composition colorants, and mixtures thereof.

The total amount of the one or more miscellaneous ingredients, if present, will vary. Nonetheless, in various embodiments, reducing composition includes about 0.001 to about 10 wt. % of one or more miscellaneous ingredients, based on the total weight of the reducing composition. In further embodiments, the reducing compositions include from about 0.001 to about 5 wt. %, about 0.001 to about 3 wt. %, about 0.01 to about 10 wt. %, about 0.01 to about 5 wt. %, about 0.01 to about 3 wt. %, about 0.1 to about 10 wt. %, about 0.1 to about 5 wt. %, or about 0.1 to about 3 wt. % of one or more miscellaneous ingredients, based on the total weight of the reducing composition.

As illustrated above and throughout the instant disclosure, the reducing composition is not a composition that deposits hair coloring agents (oxidative dye precursors, direct dyes, etc.) to the hair. Rather, it lifts color from the hair. Accordingly, the reducing composition is typically free or essentially free from coloring agents that will impart color to the hair, for example, oxidative dye precursors, direct dyes, pigments, etc.

In a preferred embodiment, the reducing composition comprises or consists of:
(a) about 2 to about 30 wt. %, preferably about 3 to about 25 wt. %, more preferably about 5 to about 20 wt. % of one or more sulfur-containing reducing agents, preferably selected from alkaline-earth metal sulfites, ammonia sulfites, thiol-based compounds, salt thereof, and a combination thereof;
(b) about 60 to about 95 wt. %, preferably about 70 to about 95 wt. %, more preferably about 80 to about 93 wt. % of water;
(c) about 0.1 to about 10 wt. %, preferably about 0.5 to about 8 wt. %, more preferably about 1 to about 5 wt. % of one or more anionic surfactants;
(d) about 0.1 to about 10 wt. %, preferably about 0.1 to about 8 wt. %, more preferably about 0.5 to about 5 wt. % of one or more thickening agents; and
(e) about 0.1 to about 10 wt. %, preferably about 0.5 to about 8 wt. %, more preferably about 1 to about 5 wt. % of one or more miscellaneous ingredients, for example, one or more preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, and a combination thereof;
wherein the weight percentages are based on a total weight of the reducing composition.

The reducing composition typically has an acidic pH. In various embodiments, the pH of the reducing composition is about 2 to less than 7. In further embodiments, the reducing composition the pH of the reducing composition is about 2 to about 6, about 2 to about 5.5, about 2 to about 5, about 2 to about 4.5, about 2 to about 4, about 3 to about 6, about 3 to about 5.5, about 3 to about 5, about 3 to about 4.5, about 3 to about 4, about 4 to about 6, or about 4 to about 5.

The viscosity of the reducing composition will vary. Nonetheless, in various embodiments, the viscosity of the reducing composition is about 100 to about 1,000 cps at 25° C. using a #2 spindle at 5 rpm. In further embodiments, the viscosity is from about 100, to about 800 cps, about 100 to about 500 cps, about 200 to about 1,000 cps, about 300 to about 1,000 cps, or about 500 to about 1,000 cps at 25° C. using a #2 spindle at 5 rpm. The viscosity can be measured, for example, using a Brookfield DVE Viscometer.

The reducing composition can be in a variety of different forms. For example, the reducing composition can be a liquid, serum, gel, a paste, a cream. It can also have a viscosity such that it can be sprayed using a typical hand-pump spray bottle onto hair. Furthermore, in various embodiments, the reducing composition is an emulsion. In other embodiments, the reducing composition is not an emulsion.

In various embodiments, the reducing composition is transparent or translucent. Alternatively, the reducing composition can be opaque. In a preferred embodiment, the reducing composition is transparent or translucent.

The reducing composition is applied to hair that has been artificially colored with oxidation dyes. The hair can be wet, damp, or dry. In some embodiments, it is beneficial if the hair is cleansed (shampooed) and the reducing composition is immediately after (e.g., within about 5 or 10 minutes) of shampooing the hair. The reducing composition is applied to the hair and allowed to remain on the hair for a period of time, for example, for about 1 minute to about 1 hour. The allows the reducing composition to coat and an absorb onto/into the hair. In various embodiments, the reducing composition is applied to the hair and allowed to remain on the hair for about 5 minutes to about 1 hour, about 5 minutes to about 45 minutes, about 5 minutes to about 30 minutes, about 5 minutes to about 15 minutes, about 10 minutes to about 1 hour, about 10 minutes to about 45 minutes, about 10 minutes to about 30 minutes.

Heat is not required for treating the hair with the reducing composition. Therefore, the treatment can be carried out a room temperature. In various embodiments, the reducing composition is applied to the hair and allowed to remain on the hair at a temperature of about 15 to about 45° C. In further embodiments, the reducing composition is applied to the hair and allowed to remain on the hair at a temperature of about 15 to about 40° C., about 15 to about 35° C., about 15 to about 30° C., about 20 to about 45° C., about 20 to about 40° C., about 20 to about 35° C., about 20 to about 30° C., about 20 to about 45° C., about 20° C. to about 40° C., about 20 to about 35° C., or about 20 to about 30° C.

After the reducing composition has remained on the hair for a sufficient amount of time, the alkaline composition is rinsed from the hair. In addition, after the reducing composition has remained the hair for a sufficient amount of time, the hair can be cleansed (shampooed).

(B) Alkalizing Composition and Method for Treating Hair

The alkalizing composition includes one or more organic alkalizing agents, for example, one or more alkanolamines. Nonlimiting examples include monoethanolamine, diethanolamine, triethanolamine, monopropanolamine, dipropanolamine, tripropanolamine, 2-amino-2-methyl-1,3-propanediol, 2-amino-2-methyl-1-propanol, and 2-amino-2-hydroxymethyl-1,3-propanediol, and a combination thereof. In a preferred embodiment, the alkalizing composition includes monoethanolamine.

In addition to the one or more organic alkalizing agents, the alkalizing composition optionally includes one or more additional alkalizing agents. Non-limiting examples of alkalizing agents include ammonia, ammonium hydroxide, ammonium carbonate, ammonium chloride, ammonium sulfate, ammonium nitrate, ammonium phosphate, ammonium acetate, ammonium hydrogen carbonate, ammonium carbamate, percarbonate salts, guanidium salts, alkali metal hydroxides (such as sodium hydroxide), alkali metal carbonates, and a mixture thereof.

The amount of the one or more organic alkalizing agents in the alkalizing composition will vary. Nonetheless, in various embodiments, the alkalizing composition includes about 1 to about 25 wt. % of the one or more organic alkalizing agents. In further embodiments, the alkalizing composition includes about 1 to about 20 wt. %, about 1 to about 15 wt. %, about 1 to about 12 wt. %, about 2 to about 25 wt. %, about 2 to about 20 wt. %, about 2 to about 15 wt. %, about 2 to about 12 wt. %, about 5 to about 25 wt. %, about 5 to about 20 wt. %, about 5 to about 15 wt. %, about 5 to about 12 wt. %, about 8 to about 25 wt. %, about 8 to about 20 wt. %, about 8 to about 15 wt. %, or about 8 to about 12 wt. %, based on the total weight of the alkalizing composition.

The amount of water in the alkalizing composition will vary. Nonetheless, in various embodiments, the alkalizing composition includes about 50 to about 98 wt. % of water. In further embodiments, the alkalizing composition includes about 60 to about 98 wt. %, about 70 to about 98 wt. %, about 75 to about 98 wt. %, about 80 to about 98 wt. %, about 50 to about 95 wt. %, about 60 to about 95 wt. %, about 70 to about 95 wt. %, about 75 to about 95 wt. %, about 80 to about 95 wt. %, about 50 to about 90 wt. %, about 60 to about 90 wt. %, about 70 to about 90 wt. %, about 75 to about 90 wt. %, or about 80 to about 90 wt. % of water.

In various embodiments, the alkalizing composition includes one or more surfactants, for example, one or more anionic surfactants, nonionic surfactants, cationic surfactants, and/or amphoteric (zwitterionic) surfactants. In particular embodiments, the alkalizing composition includes one or more anionic surfactants. In particular embodiments, the alkalizing composition includes one or more nonionic surfactants. In particular embodiments, the alkalizing composition includes one or more cationic surfactants. In particular embodiments, the alkalizing composition includes one or more amphoteric (zwitterionic) surfactants.

The total amount of the one or more surfactants in the alkalizing composition, if present, will vary. Nonetheless, in various embodiments the alkalizing composition includes about 0.1 to about 10 wt. % of the one or more surfactants, based on the total weight of the alkalizing composition. In further embodiments, the alkalizing composition includes about 0.1 to about 8 wt. %, about 0.1 to about 6 wt. %, about 0.1 to about 5 wt. %, about 0.1 to about 4 wt. %, about 0.5 to about 10 wt. %, about 0.5 to about 8 wt. %, about 0.5 to about 6 wt. %, about 0.5 to about 5 wt. %, about 0.5 to about 4 wt. %, about 1 to about 10 wt. %, about 1 to about 8 wt. %, about 1 to about 6 wt. %, about 1 to about 5 wt. %, or about 1 to about 4 wt. % of the one or more surfactants, based on the total weight of the one or more surfactants.

As noted above, in various embodiments, the alkalizing composition includes one or more anionic surfactants. Non-limiting examples of anionic surfactants include alkyl carboxylic acids, alkyl ether carboxylic acids, alkyl phosphates, alkyl ether phosphates, alkyl sulfates, alkyl ether sulfates, alkyl sulfonates, alkyl ether sulfonates, and salts thereof. In certain embodiments, the hair coloring base composition includes one or more alkyl ether carboxylic acids. Nonlimiting examples of alkyl ether carboxylic acids include ceteareth-2 carboxylic acid, ceteareth-10 carboxylic acid, coceth-7 carboxylic acid, laureth-4 carboxylic acid, laureth-5 carboxylic acid, laureth-6 carboxylic acid, myreth-2 carboxylic acid, myreth-3 carboxylic acid, myreth-4 carboxylic acid, myreth-5 carboxylic acid, myreth-6 carboxylic acid, steareth-2 carboxylic acid, steareth-4 carboxylic acid, steareth-5 carboxylic acid, steareth-6 carboxylic acid, oleth-2 carboxylic acid, oleth-4 carboxylic acid, and mixtures and/or salts thereof.

Preferred anionic surfactants include:

Acyl sarcosinates containing 8 to 24 C atoms in the acyl group;

Acyl taurates containing 8 to 24 C atoms in the acyl group;

Acyl isethionates containing 8 to 24 C atoms in the acyl group;

Acyl glycinates containing 8 to 24 C atoms in the acyl group;

Acyl lactylates containing 8 to 24 C atoms in the acyl group;

Sulphosuccinic acid mono and/or dialkyl esters containing 8 to 24 C atoms in the alkyl group and sulphosuccinic acid monoalkyl polyoxyethylesters containing 8 to 24 C atoms in the alkyl group and 1 to 6 oxyethyl groups; and/or Alkyl sulfates and/or alkylether sulfate salts with formula R—(OCH$_2$—CH2)$_n$-O—SO$_3$X, in which R preferably represents a linear or branched, saturated or unsaturated alkyl group containing 8 to 24 C atoms, x represents the number 0 or 1 to 12 and X represents an alkali, alkaline earth, ammonium or alkanolamine ion.

Particularly preferred anionic surfactants include alkali, alkaline earth and/or ammonium salts of linear or branched, saturated or unsaturated alkyl sulfates, alkylether sulfates, acyl isethionates, acyl glycinates, acyl taurates, acyl sarcosinates, acyl lactylates and/or acyl sulphosuccinates, the alkyl or acyl groups of which respectively contain 6 to 24 carbon atoms. Particularly preferred anionic surfactants include compounds with the INCI names: sodium laureth sulfate, sodium myreth sulfate, sodium trideceth sulfate, sodium lauroyl lactylate, sodium stearoyl lactylate, sodium cocoyl isethionate, sodium methyl cocoyl isethionate, sodium cocoyl glycinate, sodium methyl cocoyl glycinate, sodium cocoyl taurate, sodium methyl cocoyl taurate, sodium myristoyl sarcosinate, sodium cocoyl sarcosinate, sodium tallowate, sodium palmate and/or sodium lardate, and a mixture thereof.

If present, the amount of the one or more anionic surfactants will vary. Nonetheless, in various embodiments, the alkalizing composition includes about 0.1 to about 10 wt. % of the one or more anionic surfactants. In further embodiments, the alkalizing composition includes about 0.1 to about 8 wt. %, about 0.1 to about 5 wt. %, about 0.1 to about 4 wt. %, about 0.5 to about 10 wt. %, about 0.5 to about 8 wt. %, about 0.5 to about 5 wt. %, about 0.5 to about 4 wt. %, about 1 to about 10 wt. %, about 1 to about 8 wt. %, about 1 to about 5 wt. %, or about 1 to about 4 wt. % of the one or more anionic surfactants, based on the total weight of the alkalizing composition.

In various embodiments, the alkalizing composition includes one or more nonionic surfactants. Nonlimiting examples of nonionic surfactants include oxyethylenated amides, oxyethylenated fatty alcohols, and block-copolymer (polycondensate) surfactants of ethylene oxide and of propylene oxide, and a mixture thereof. In a preferred embodiment, the hair coloring base composition includes PEG-4 rapeseedamide (an oxyethylenated amide), deceth-3 (an oxyethylenated fatty alcohol), poloxamer 338 (block-copolymer (polycondensate) surfactants of ethylene oxide and of propylene oxide), or a combination thereof.

A more exhaustive list of useful nonionic surfactants that may be included in the alkalizing composition is provided later, under the heading "Nonionic Surfactants."

If present, the amount of the one or more nonionic surfactants will vary. Nonetheless, in various embodiments, the alkalizing composition includes about 0.1 to about 10 wt. % of the one or more nonionic surfactants. In further embodiments, the alkalizing composition includes about 0.1 to about 8 wt. %, about 0.1 to about 5 wt. %, about 0.1 to about 4 wt. %, about 0.5 to about 10 wt. %, about 0.5 to about 8 wt. %, about 0.5 to about 5 wt. %, about 0.5 to about 4 wt. %, about 1 to about 10 wt. %, about 1 to about 8 wt. %, about 1 to about 5 wt. %, or about 1 to about 4 wt. % of the one or more nonionic surfactants, based on the total weight of the alkalizing composition.

In various embodiment, the alkalizing composition includes one or more cationic surfactants. The term "cationic surfactant" means a surfactant that may be positively charged when it is contained in the compositions according to the disclosure. This surfactant may bear one or more positive permanent charges or may contain one or more functional groups that are cationizable in the composition according to the disclosure. Non-limiting examples of cationic surfactants include cetrimonium chloride, stearimonium chloride, behentrimonium chloride, behentrimonium methosulfate, behenamidopropyltrimonium methosulfate, stearamidopropyltrimonium chloride, arachidtrimonium chloride, distearyldimonium chloride, dicetyldimonium chloride, tricetylmonium chloride, oleamidopropyl dimethylamine, linoleamidopropyl dimethylamine, isostearamidopropyl dimethylamine, oleyl hydroxyethyl imidazoline, stearamidopropyldimethylamine, behenamidopropyldimethylamine, behenamidopropyldiethylamine, behenamidoethyldiethyl-amine, behenamidoethyldimethylamine, arachidamidopropyldimethylamine, arachidamido-propyidiethylamine, arachidamidoethyidiethylamine, arachidamidoethyidimethylamine, brassicamidopropyldimethylamine, lauramidopropyl dimethylamine, myristamidopropyl dimethylamine, dilinoleamidopropyl dimethylamine, palmitamidopropyl dimethylamine, and a combination thereof.

In various embodiments, the one or more cationic surfactants are selected from cetrimonium chloride, stearimonium chloride, behentrimonium chloride, behentrimonium methosulfate, behenamidopropyltrimonium methosulfate, stearamidopropyltrimonium chloride, arachidtrimonium chloride, distearyldimonium chloride, dicetyldimonium chloride, tricetylmonium chloride, oleamidopropyl dimethylamine, linoleamidopropyl dimethylamine, isostearamidopropyl dimethylamine, oleyl hydroxyethyl imidazoline, stearamidopropyldimethylamine, behenamidopropyldimethylamine, behenamidopropyldiethylamine, behenamidoethyldiethyl-amine, behenamidoethyldimethylamine, arachidamidopropyldimethylamine, arachidamido-propyidiethylamine, arachidamidoethyidiethylamine, arachidamidoethyidimethylamine, and a combination thereof.

In further embodiments, the one or more cationic surfactants are preferably selected from cetrimonium chloride, behentrimonium chloride, behentrimonium methosulfate, stearamidopropyl dimethylamine, and a combination thereof.

If present, the amount of the one or more cationic surfactants will vary. Nonetheless, in various embodiments, the alkalizing composition includes about 0.1 to about 10 wt. % of the one or more cationic surfactants. In further embodiments, the alkalizing composition includes about 0.1 to about 8 wt. %, about 0.1 to about 5 wt. %, about 0.1 to about 4 wt. %, about 0.5 to about 10 wt. %, about 0.5 to about 8 wt. %, about 0.5 to about 5 wt. %, about 0.5 to about 4 wt. %, about 1 to about 10 wt. %, about 1 to about 8 wt. %, about 1 to about 5 wt. %, or about 1 to about 4 wt. % of the one or more nonionic surfactants, based on the total weight of the cationic composition.

In various embodiments, the alkalizing composition includes one or more thickening agents. The term "thickening agent" is interchangeable with the term "thickener." Nonlimiting examples of thickening agents include polyacrylate crosspolymers including crosslinked polyacrylate polymers, cationic acrylate copolymers, anionic acrylic or carboxylic acid polymers, polyacrylamide polymers, polysaccharides, gums, polyquaterniums, vinylpyrrolidone homopolymers/copolymers, C8-24 hydroxyl substituted aliphatic acid, C8-24 conjugated aliphatic acid, sugar fatty esters, polyglyceryl esters, and a mixture thereof. In a preferred embodiment, the alkalizing composition includes one or more natural thickening agents. Nonlimiting examples of natural thickening agents include polysaccharides such as glucans, modified and unmodified starches, amylose, amylopectins, dextrans, celluloses and their derivatives (methylcelluloses, hydroxyalkylcelluloses, ethylhydroxyethylcelluloses and carboxymethylcelluloses), mannans, xylans, lignins, chitin, chitosans, pectins, alginic acids and alginates, arabinogalactans, carrageenans and carrageenates, agar, gums (arabicum, karaya), carob bean gum, galactomannans such as guar gum and non-ionic derivatives (hydroxypropyl guar), xanthan gum, scleroglucan, and mixtures thereof. In a preferred embodiment, the alkalizing composition includes one or more natural thickening agents.

A more exhaustive list of useful thickening agents that may be included in the alkalizing composition is provided later, under the heading "Thickening agents."

The amount of the one or more thickening agents in the alkalizing composition, if present, will vary. Nonetheless, in various embodiments, the alkalizing composition includes about 0.1 to about 10 wt. % of the one or more thickening agents. In further embodiments, the alkalizing composition includes about 0.1 to about 8 wt. %, about 0.1 to about 5 wt. %, 0.1 to about 4 wt. %, about 0.1 to about 3 wt. %, about 0.5 to about 10 wt. %, about 0.5 to about 8 wt. %, about 0.5 to about 5 wt. %, about 0.5 to about 4 wt. %, or about 0.5 to about 3 wt. %, based on the total weight of the alkalizing composition.

In various embodiments, the alkalizing composition includes one or more water-soluble organic solvents (or simply "water-soluble solvents"). The term "water-soluble organic solvent" (or "water-soluble solvent") is interchangeable with the term "water-miscible solvent" and has been defined above. Non-limiting examples of water-soluble organic solvents include glycerin, alcohols (for example, $C_{1-30}$, $C_{1-15}$, $C_{1-10}$, or $C_{1-4}$ alcohols), polyols, glycols, and a mixture thereof. In certain embodiments, the one or more water-soluble organic solvents are chosen from alcohols such as ethyl alcohol, isopropyl alcohol, propyl alcohol, benzyl alcohol, and phenylethyl alcohol, or glycols or glycol ethers such as monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol.

Further non-limiting but useful examples of water-soluble organic solvents include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, (caprylyl glycol), 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, sulfolane, and a mixture thereof.

In various embodiments, the alkalizing composition includes one or more water-soluble organic solvents chosen from glycols, $C_{1-4}$ alcohols, glycerin, and a mixture thereof; preferably the water-soluble organic solvent is chosen from caprylyl glycol, glycerin, ethanol, isopropyl alcohol, dipropylene glycol, propylene glycol, hexylene glycol, caprylyl glycol, propylene glycol, glycerin, ethanol, and a mixture thereof.

In certain embodiments, the alkalizing composition includes one or more polyhydric alcohols. Nonlimiting examples of polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, and a mixture thereof. Polyol compounds may also be used. Non-limiting examples include the aliphatic diols, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol, and a mixture thereof.

The total amount of the one or more water-soluble organic solvents in the alkalizing composition, if present, will vary. In various embodiments, the alkalizing composition includes about 1 to about 40 wt. % of the one or more water-soluble organic solvents, based on the total weight of the alkalizing composition. In further embodiments, the hair alkalizing composition includes about 0.1 to about 30 wt. %, about 0.1 to about 20 wt. %, about 0.1 to about 10 wt. %, about 0.1 to about 5 wt. %, about 1 to about 30 wt. %, about 1 to about 20 wt. %, about 1 to about 10 wt. %, about 1 to about 5 wt., based on the total weight of the alkalizing composition.

In various embodiments, the alkalizing composition includes one or more miscellaneous ingredients. Miscellaneous ingredients are ingredients that are compatible with the reducing composition and do not disrupt or materially affect the basic and novel properties of the compositions (e.g., the "alkalizing" nature of the composition). Nonlimiting examples of ingredients include preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, thickening agents, etc.

In various embodiments, the miscellaneous ingredients are chosen from preservatives, fragrances, pH adjusters, salts, chelating agents, buffers, composition colorants, and mixtures thereof.

The total amount of the one or more miscellaneous ingredients, if present, will vary. Nonetheless, in various embodiments, alkalizing composition includes about 0.001 to about 10 wt. % of one or more miscellaneous ingredients, based on the total weight of the reducing composition. In further embodiments, the alkalizing compositions include from about 0.001 to about 5 wt. %, about 0.001 to about 3 wt. %, about 0.01 to about 10 wt. %, about 0.01 to about 5 wt. %, about 0.01 to about 3 wt. %, about 0.1 to about 10 wt. %, about 0.1 to about 5 wt. %, or about 0.1 to about 3 wt.

% of one or more miscellaneous ingredients, based on the total weight of the alkalizing composition.

As the name indicates, an alkalizing composition has an alkaline pH. The pH of the alkalizing composition is generally from about 8 to about 13. Preferably, the pH of the alkalizing agent is from about 8 to about 12, about 8 to about 11, or about 8 to about 10, about 9 to about 13, about 9 to about 12, about 9 to about 10, about 10 to about 13, about 10 to about 12, or about 11 to about 12.

The viscosity of the alkalizing composition will vary. Nonetheless, in various embodiments, the viscosity of the alkalizing composition is about 2,000 to about 10,000 cps at 25° C. using a #2 spindle at 5 rpm. In further embodiments, the viscosity of the alkalizing composition is about 2,000 to about 8,000 cps, about 2,000 to about 5,000 cps, about 3,000 to about 10,000 cps, about 3,000 to about 8,000 cps, about 2,500 to about 10,000 cps, about 3,000 to about 10,000 cps, about 3,500 to about 10,000 cps, about 4,000 to about 10,000 cps, or about 5,000 to about 10,000 cps at 25° C. using a #2 spindle at 5 rpm. The viscosity can be measured, for example, using a Brookfield DVE Viscometer.

The alkalizing composition can be in a variety of different forms. For example, the alkalizing composition can be a liquid, serum, gel, a paste, a cream. It can also have a viscosity such that it can be sprayed using a typical hand-pump spray bottle onto hair. Furthermore, in various embodiments, the alkalizing composition is an emulsion. In other embodiments, the alkalizing composition is not an emulsion.

In various embodiments, the alkalizing composition is transparent or translucent. Alternatively, the alkalizing composition can be opaque. In a preferred embodiment, the alkalizing composition is transparent or translucent.

The alkalizing composition is applied to hair that has been artificially colored with oxidation dyes. The hair can be wet, damp, or dry. In some embodiments, it is beneficial if the hair is cleansed (shampooed) and the alkalizing composition is applied to the hair immediately after (e.g., within about 5 or 10 minutes) of cleansing (shampooing) the hair. The alkalizing composition is applied to the hair and allowed to remain on the hair for a period of time, for example, for about 1 minute to about 1 hour. The allows the alkalizing composition to coat and an absorb onto/into the hair. In various embodiments, the alkalizing composition is applied to the hair and allowed to remain on the hair for about 5 minutes to about 1 hour, about 5 minutes to about 45 minutes, about 5 minutes to about 30 minutes, about 5 minutes to about 15 minutes, about 10 minutes to about 1 hour, about 10 minutes to about 45 minutes, about 10 minutes to about 30 minutes.

Heat is not required for treating the hair with the alkalizing composition. Therefore, the treatment can be carried out a room temperature. In various embodiments, the alkalizing composition is applied to the hair and allowed to remain on the hair at a temperature of about 15 to about 45° C. In further embodiments, the alkalizing composition is applied to the hair and allowed to remain on the hair at a temperature of about 15 to about 40° C., about 15 to about 35° C., about 15 to about 30° C., about 20 to about 45° C., about 20 to about 40° C., about 20 to about 35° C., about 20 to about 30° C., about 20 to about 45° C., about 20° C. to about 40° C., about 20 to about 35° C., or about 20 to about 30° C.

After the alkalizing composition has remained on the hair for a sufficient amount of time, the alkalizing composition is rinsed from the hair. In addition, after the alkalizing composition has remained on the hair for a sufficient amount of time, the hair can be cleansed (shampooed).

Methods for treating artificially colored with a reducing composition and with an alkalizing composition are described above. As already mentioned, the treatments are preferably used in conjunction with one another, i.e., artificially colored hair is sequentially treated with the reducing composition and the alkalizing composition. Treatment with the reducing composition can be carried out first followed by treatment with the alkalizing composition or the order can be reversed, i.e., treatment with the alkalizing composition carried out first followed by treatment with the reducing composition. Preferably, treatment with the reducing composition is carried out before treatment with the alkalizing composition. Regardless, the treatments are both carried within a reasonably time frame from one another, i.e., within about 1 or 2 hours of each other. The hair is treated with the first composition/treatment and the first composition/treatment is rinsed from the hair. The hair can optionally be cleansed with a shampoo after the first treatment. Within about 1 hour from rinsing or cleansing the first composition/treatment from the hair, the hair is treated with the second composition/treatment. After the hair is treated with the second composition/treatment, the second composition/treatment is rinsed from the hair. The hair can optionally cleansed with a shampoo after the second treatment. The two treated are carried out consecutively, typically one right after the other. In other words, the first treatment is not carried out on one day and the second treatment carried out on another day. Instead, the second treatment is usually carried out within about 1 hour from completion of the first treatment. For example, the second treatment can be carried out within about 45 minutes after completion of the first treatment. In further embodiments, the second treatment can be carried out within about 40 minutes, 35 minutes, 30 minutes, 25 minutes, 20 minutes, 15 minutes, 10 minutes, or 5 minutes after competition of the first treatment.

In various embodiments, the reducing composition is free or essentially free from imidazolium compounds. In various embodiments, the alkalizing composition is free or essentially free from imidazolium compounds. In various embodiments, the reducing compositions and/or the alkalizing composition is transparent or translucent. In various embodiments, the reducing composition and/or the alkalizing compositions are individually an emulsion, not an emulsion, a gel, a paste, a spray, or a serum.

In various embodiments, the methods of the instant disclosure comprise or consist of:

(I) applying a reducing composition to the oxidatively colored hair and allowing the reducing composition to remain on the hair for about 5 to about 60 minutes, preferably about 5 to about 30 minutes, more preferably about 5 to about 20 minutes, at a temperature of about 15 to about 45° C., preferably about 15 to about 35° C., more preferably about 20 to about 30° C., the reducing composition comprising or consisting of:
  (a) about 2 to about 35 wt. %, preferably about 5 to about 30 wt. %, more preferably about 10 to about 20 wt. %, based on a total weight of the reducing composition, of one or more sulfur-containing reducing agent, preferably one or more sulfur-containing reducing agents selected from sodium metabisulfite, thiolactic acid, ammonium thioglycolate, thioglycolic acid, calcium thioglycolate, salts thereof, and a combination thereof, more preferably sodium metabisulfite;

(b) about 60 to about 95 wt. %, preferably about 70 to about 95 wt. %, more preferably about 80 to about 90 wt. %, based on a total weight of the reducing composition, of water;

(c) about 0.5 to about 10 wt. %, preferably about 0.5 to about 5 wt. %, more preferably about 1 to about 5 wt. %, based on a total weight of the reducing composition, of one or more anionic surfactants, preferably one or more anionic surfactants selected from acyl sarcosinates containing 8 to 24 C atoms in the acyl group; acyl taurates containing 8 to 24 C atoms in the acyl group; acyl isethionates containing 8 to 24 C atoms in the acyl group; acyl glycinates containing 8 to 24 C atoms in the acyl group; acyl lactylates containing 8 to 24 C atoms in the acyl group; sulphosuccinic acid mono and/or dialkyl esters containing 8 to 24 C atoms in the alkyl group and sulfosuccinic acid monoalkyl polyoxyethylesters containing 8 to 24 C atoms in the alkyl group and 1 to 6 oxyethyl groups; and alkyl sulfates and/or alkylether sulfate salts with formula R—(OCH$_2$—CH2)$_n$-O—SO$_3$X, in which R preferably represents a linear or branched, saturated or unsaturated alkyl group containing 8 to 24 C atoms, x represents the number 0 or 1 to 12 and X represents an alkali, alkaline earth, ammonium or alkanolamine ion, more preferably one or more anionic surfactants selected from alkyl sulfates, alkylether sulfates, acyl isethionates, salts thereof, and a combination thereof; and (d) about 0.01 to about 5 wt. %, preferably about 0.1 to about 5 wt. %, more preferably about 0.5 to about 3 wt. %, based on a total weight of the reducing composition, of one or more thickening agents, preferably one or more natural thickening agents, more preferably, one or more natural thickening agents selected from polysaccharides such as glucans, modified and unmodified starches, amylose, amylopectins, dextrans, celluloses and their derivatives (methylcelluloses, hydroxyalkylcelluloses, ethylhydroxyethylcelluloses and carboxymethylcelluloses), mannans, xylans, lignins, chitin, chitosans, pectins, alginic acids and alginates, arabinogalactans, carrageenans and carrageenates, agar, gums (arabicum, karaya), carob bean gum, galactomannans such as guar gum and non-ionic derivatives (hydroxypropyl guar), xanthan gum, scleroglucan, and combinations thereof;

(e) optionally, about 0.01 to about 10 wt. %, preferably about 1 to about 8 wt. %, more preferably about 1 to about 5 wt. % of one or more miscellaneous ingredients, preferably one or more miscellaneous ingredients selected from preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, and a combination thereof;

wherein the reducing composition is free from oxidative dye precursors (i.e., the reducing composition is not a composition that deposits color onto/into the hair; it does not include direct dyes, pigments, oxidative dye precursors, or other hair coloring agents that could be deposited onto the hair);

(II) rinsing the reducing composition from the hair and optionally shampooing the hair;

(III) applying an alkalizing composition to the hair and allowing the alkalizing composition to remain on the hair for about 1 to about 60 minutes at a temperature of about 15 to about 45° C., the alkalizing composition comprising or consisting of:

(a) about 1 to about 25 wt. %, preferably about 2 to about 20 wt. %, more preferably about 5 to about 15 wt. %, based on a total weight of the alkalizing composition, of one or more organic alkalizing agents, preferably one or more organic alkalizing agents selected from monoethanolamine, diethanolamine, triethanolamine, monopropanolamine, dipropanolamine, tripropanolamine, 2-amino-2-methyl-1,3-propanediol, 2-amino-2-methyl-1-propanol, and 2-amino-2-hydroxymethyl-1,3-propanediol, and a combination thereof, more preferably monoethanolamine; and (b) about 50 to about 98 wt. %, preferably about 75 to about 95 wt. %, more preferably about 80 to about 95 wt. %, based on the total weight of the alkalizing composition, of water; and (c) optionally, about 0.01 to about 10 wt. %, preferably about 1 to about 8 wt. %, more preferably about 1 to about 5 wt. % of one or more miscellaneous ingredients, preferably one or more miscellaneous ingredients selected from preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, and a combination thereof;

(IV) rinsing the reducing composition from the hair and optionally shampooing the hair; and (V) optionally, drying and styling the hair after rinsing and optionally shampooing the hair in (IV);

wherein (I) and (II) can be carried out before (III) and (IV), or (III) and (IV) can be carried out before (I) and (II);

the method removes color and/or oxidative dyes and/or oxidative dye precursors from the colored hair;

the reducing composition and/or the alkalizing composition is preferably transparent or translucent;

the reducing composition preferably has a pH of about 2 to less than 7, preferably about 2 to about 6, more preferably about 3 to about 5.5 (or 5) and the alkalizing composition preferably has a pH of about 9 to about 12, preferably about 10 to about 12 or about 9 to about 11;

the method does not comprise treating the hair with oxidizing agents (such as peroxide and persulfates); and the treatment with the reducing composition of (I) and the treatment with the alkalizing composition of (III) is carried out within about 1 hour, preferably within about 45 minutes, more preferably within about 30 minutes of one another.

In various embodiments, the methods of the instant disclosure comprise or consist of:

(I) applying a reducing composition to the oxidatively colored hair and allowing the reducing composition to remain on the hair for about 5 to about 60 minutes, preferably about 5 to about 30 minutes, more preferably about 5 to about 20 minutes, at a temperature of about 15 to about 45° C., preferably about 15 to about 35° C., more preferably about 20 to about 30° C., the reducing composition comprising or consisting of:

(a) about 2 to about 35 wt. %, preferably about 5 to about 30 wt. %, more preferably about 10 to about 20 wt. %, based on a total weight of the reducing composition, of one or more sulfur-containing reducing agent selected from sodium metabisulfite, thiolactic acid, ammonium thioglycolate, thioglycolic acid, calcium thioglycolate, salts thereof, and a combination thereof, preferably sodium metabisulfite;

(b) about 60 to about 95 wt. %, preferably about 70 to about 95 wt. %, more preferably about 80 to about 90 wt. %, based on a total weight of the reducing composition, of water;

(c) about 0.5 to about 10 wt. %, preferably about 0.5 to about 5 wt. %, more preferably about 1 to about 5 wt. %, based on a total weight of the reducing composition, of one or more anionic surfactants, preferably one or more anionic surfactants selected from acyl sarcosinates containing 8 to 24 C atoms in the acyl group; acyl taurates containing 8 to 24 C atoms in the acyl group; acyl isethionates containing 8 to 24 C atoms in the acyl group; acyl glycinates containing 8 to 24 C atoms in the acyl group; acyl lactylates containing 8 to 24 C atoms in the acyl group; sulphosuccinic acid mono and/or dialkyl esters containing 8 to 24 C atoms in the alkyl group and sulfosuccinic acid monoalkyl polyoxyethylesters containing 8 to 24 C atoms in the alkyl group and 1 to 6 oxyethyl groups; and alkyl sulfates and/or alkylether sulfate salts with formula R—(OCH$_2$—CH2)$_n$-O—SO$_3$X, in which R preferably represents a linear or branched, saturated or unsaturated alkyl group containing 8 to 24 C atoms, x represents the number 0 or 1 to 12 and X represents an alkali, alkaline earth, ammonium or alkanolamine ion, more preferably one or more anionic surfactants selected from alkyl sulfates, alkylether sulfates, acyl isethionates, salts thereof, and a combination thereof; and (d) about 0.01 to about 5 wt. %, preferably about 0.1 to about 5 wt. %, more preferably about 0.5 to about 3 wt. %, based on a total weight of the reducing composition, of one or more natural thickening agents selected from polysaccharides such as glucans, modified and unmodified starches, amylose, amylopectins, dextrans, celluloses and their derivatives (methylcelluloses, hydroxyalkylcelluloses, ethylhydroxyethylcelluloses and carboxymethylcelluloses), mannans, xylans, lignins, chitin, chitosans, pectins, alginic acids and alginates, arabinogalactans, carrageenans and carrageenates, agar, gums (arabicum, karaya), carob bean gum, galactomannans such as guar gum and non-ionic derivatives (hydroxypropyl guar), xanthan gum, scleroglucan, and combinations thereof, preferably xanthan gum;

(e) optionally, about 0.01 to about 10 wt. %, preferably about 1 to about 8 wt. %, more preferably about 1 to about 5 wt. % of one or more miscellaneous ingredients, preferably one or more miscellaneous ingredients selected from preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, and a combination thereof;

wherein the reducing composition is free from oxidative dye precursors (i.e., the reducing composition is not a composition that deposits color onto/into the hair; it does not include direct dyes, pigments, oxidative dye precursors, or other hair coloring agents that could be deposited onto the hair);

(II) rinsing the reducing composition from the hair and optionally shampooing the hair;

(III) applying an alkalizing composition to the hair and allowing the alkalizing composition to remain on the hair for about 1 to about 60 minutes at a temperature of about 15 to about 45° C., wherein the alkalizing composition comprises:

(a) about 1 to about 25 wt. %, preferably about 2 to about 20 wt. %, more preferably about 5 to about 15 wt. %, based on a total weight of the alkalizing composition, of one or more organic alkalizing agents selected from monoethanolamine, diethanolamine, triethanolamine, monopropanolamine, dipropanolamine, tripropanolamine, 2-amino-2-methyl-1,3-propanediol, 2-amino-2-methyl-1-propanol, and 2-amino-2-hydroxymethyl-1,3-propanediol, and a combination thereof, more preferably monoethanolamine; and (b) about 50 to about 98 wt. %, preferably about 75 to about 95 wt. %, more preferably about 80 to about 95 wt. %, based on the total weight of the alkalizing composition, of water; and (c) optionally, about 0.01 to about 10, preferably about 0.01 to about 5, more preferably about 0.1 to about 5 wt. %, based on the total weight of the alkalizing composition, of one or more surfactants selected from anionic surfactants, nonionic surfactants, cationic surfactants, amphoteric surfactants, or a combination thereof;

(d) optionally, about 0.01 to about 10 wt. %, preferably about 1 to about 8 wt. %, more preferably about 1 to about 5 wt. % of one or more miscellaneous ingredients, preferably one or more miscellaneous ingredients selected from preservatives, fragrances, pH adjusters, salts, chelating agents, buffers, antioxidants, flavonoids, vitamins, botanical extracts, UV filtering agents, proteins, protein hydrolysates, and/or isolates, fillers, composition colorants, cationic polymers, and a combination thereof;

(IV) rinsing the reducing composition from the hair and optionally shampooing the hair; and (V) optionally, drying and styling the hair after rinsing and optionally shampooing the hair in (IV);

wherein (I) and (II) can be carried out before (III) and (IV), or (III) and (IV) can be carried out before (I) and (II);

the method removes color and/or oxidative dyes and/or oxidative dye precursors from the colored hair;

the reducing composition and/or the alkalizing composition is preferably transparent or translucent;

the reducing composition preferably has a pH of about 2 to less than 7, preferably about 2 to about 6, more preferably about 3 to about 5.5 (or 5) and the alkalizing composition preferably has a pH of about 9 to about 12, preferably about 10 to about 12 or about 9 to about 11;

the method does not comprise treating the hair with oxidizing agents (such as peroxide and persulfates); and the treatment with the reducing composition of (I) and the treatment with the alkalizing composition of (III) is carried out within about 1 hour, preferably within about 45 minutes, more preferably within about 30 minutes of one another.

The instant disclosure also relates to kits. For example, in various embodiments, the instant disclosure relates to a kit comprising: (A) one or more reducing compositions as described herein; and (B) one or more alkalizing composition as described herein; wherein the one or more reducing compositions and the one or more alkalizing composition are separately contained. In further embodiments, the kit additionally includes one or more cleansing compositions (a shampoo), one or more conditioning compositions (a conditioner), or both one or more cleansing compositions and one or more conditioning compositions.

Nonionic Surfactants

Nonionic surfactants are compounds well known in themselves (see, e.g., in this regard, "Handbook of Surfactants" by M. R. Porter, Blackie & Son publishers (Glasgow and London), 1991, pp. 116-178), which is incorporated herein by reference in its entirety.

The nonionic surfactant can be, for example, selected from alcohols, alpha-diols, alkylphenols and esters of fatty acids, these compounds being ethoxylated, propoxylated or glycerolated and having at least one fatty chain comprising, for example, from 8 to 18 carbon atoms, it being possible for the number of ethylene oxide or propylene oxide groups to range from 2 to 50, and for the number of glycerol groups to range from 1 to 30. Maltose derivatives may also be mentioned. Non-limiting mention may also be made of copolymers of ethylene oxide and/or of propylene oxide; condensates of ethylene oxide and/or of propylene oxide with fatty alcohols; polyethoxylated fatty amides comprising, for example, from 2 to 30 mol of ethylene oxide; polyglycerolated fatty amides comprising, for example, from 1.5 to 5 glycerol groups, such as from 1.5 to 4; ethoxylated fatty acid esters of sorbitan comprising from 2 to 30 mol of ethylene oxide; ethoxylated oils from plant origin; fatty acid esters of sucrose; fatty acid esters of polyethylene glycol; polyethoxylated fatty acid mono or diesters of glycerol ($C_6$-$C_{24}$)alkylpolyglycosides; N—($C_6$-$C_{24}$)alkylglucamine derivatives, amine oxides such as ($C_{10}$-$C_{14}$)alkylamine oxides or N—($C_{10}$-$C_{14}$)acylaminopropylmorpholine oxides; and a mixture thereof.

The nonionic surfactants may preferably be chosen from polyoxyalkylenated or polyglycerolated nonionic surfactants. The oxyalkylene units are more particularly oxyethylene or oxypropylene units, or a combination thereof, and are preferably oxyethylene units.

Examples of oxyalkylenated nonionic surfactants that may be mentioned include: oxyalkylenated ($C_8$-$C_{24}$)alkylphenols, saturated or unsaturated, linear or branched, oxyalkylenated $C_8$-$C_{30}$ alcohols, saturated or unsaturated, linear or branched, oxyalkylenated $C_8$-$C_{30}$ amides, esters of saturated or unsaturated, linear or branched, $C_8$-$C_{30}$ acids and of polyethylene glycols, polyoxyalkylenated esters of saturated or unsaturated, linear or branched, $C_8$-$C_{30}$ acids and of sorbitol, saturated or unsaturated, oxyalkylenated plant oils, condensates of ethylene oxide and/or of propylene oxide, inter alia, alone or as mixtures.

The surfactants preferably contain a number of moles of ethylene oxide and/or of propylene oxide of between 2 and 100 and most preferably between 2 and 50.

In accordance with one preferred embodiment of the invention, the oxyalkylenated nonionic surfactants are chosen from oxyethylenated $C_8$-$C_{30}$ alcohols.

Examples of ethoxylated fatty alcohols (or $C_8$-$C_{30}$ alcohols) that may be mentioned include the adducts of ethylene oxide with lauryl alcohol, especially those containing from 9 to 50 oxyethylene groups and more particularly those containing from 10 to 25 oxyethylene groups (Laureth-10 to Laureth-25); the adducts of ethylene oxide with behenyl alcohol, especially those containing from 9 to 50 oxyethylene groups (Beheneth-9 to Beheneth-50); the adducts of ethylene oxide with cetearyl alcohol (mixture of cetyl alcohol and stearyl alcohol), especially those containing from 10 to 30 oxyethylene groups (Ceteareth-10 to Ceteareth-30); the adducts of ethylene oxide with cetyl alcohol, especially those containing from 10 to 30 oxyethylene groups (Ceteth-10 to Ceteth-30); the adducts of ethylene oxide with stearyl alcohol, especially those containing from 10 to 30 oxyethylene groups (Steareth-10 to Steareth-30); the adducts of ethylene oxide with isostearyl alcohol, especially those containing from 10 to 50 oxyethylene groups (Isosteareth-10 to Isosteareth-50); and a mixture thereof.

As examples of polyglycerolated nonionic surfactants, polyglycerolated $C_8$-$C_{40}$ alcohols are preferably used.

In particular, the polyglycerolated $C_8$-$C_{40}$ alcohols correspond to the following formula:

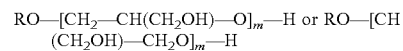

RO—[CH$_2$—CH(CH$_2$OH)—O]$_m$—H or RO—[CH(CH$_2$OH)—CH$_2$O]$_m$—H in which R represents a linear or branched $C_8$-$C_{40}$ and preferably $C_8$-$C_{30}$ alkyl or alkenyl radical, and m represents a number ranging from 1 to 30 and preferably from 1.5 to 10.

As examples of compounds that are suitable in the context of the invention, mention may be made of lauryl alcohol containing 4 mol of glycerol (INCI name: Polyglyceryl-4 Lauryl Ether), lauryl alcohol containing 1.5 mol of glycerol, oleyl alcohol containing 4 mol of glycerol (INCI name: Polyglyceryl-4 Oleyl Ether), oleyl alcohol containing 2 mol of glycerol (INCI name: Polyglyceryl-2 Oleyl Ether), cetearyl alcohol containing 2 mol of glycerol, cetearyl alcohol containing 6 mol of glycerol, oleocetyl alcohol containing 6 mol of glycerol, and octadecanol containing 6 mol of glycerol.

The alcohol may represent a mixture of alcohols in the same way that the value of m represents a statistical value, which means that, in a commercial product, several species of polyglycerolated fatty alcohol may coexist in the form of a mixture.

According to one of the embodiments according to the present invention, the nonionic surfactant may be selected from esters of polyols with fatty acids with a saturated or unsaturated chain containing for example from 8 to 24 carbon atoms, preferably 12 to 22 carbon atoms, and alkoxylated derivatives thereof, preferably with a number of alkyleneoxide of from 10 to 200, and more preferably from 10 to 100, such as glyceryl esters of a $C_8$-$C_{24}$, preferably $C_{12}$-$C_{22}$, fatty acid or acids and alkoxylated derivatives thereof, preferably with a number of alkyleneoxide of from 10 to 200, and more preferably from 10 to 100; polyethylene glycol esters of a $C_8$-$C_{24}$, preferably $C_{12}$-$C_{22}$, fatty acid or acids and alkoxylated derivatives thereof, preferably with a number of alkyleneoxide of from 10 to 200, and more preferably from 10 to 100; sorbitol esters of a $C_8$-$C_{24}$, preferably $C_{12}$-$C_{22}$, fatty acid or acids and alkoxylated derivatives thereof, preferably with a number of alkyleneoxide of from 10 to 200, and more preferably from 10 to 100; sugar (sucrose, glucose, alkylglycose) esters of a $C_8$-$C_{24}$, preferably $C_{12}$-$C_{22}$, fatty acid or acids and alkoxylated derivatives thereof, preferably with a number of alkyleneoxide of from 10 to 200, and more preferably from 10 to 100; ethers of fatty alcohols; ethers of sugar and a $C_8$-$C_{24}$, preferably $C_{12}$-$C_{22}$, fatty alcohol or alcohols; and a mixture thereof.

Examples of ethoxylated fatty esters that may be mentioned include the adducts of ethylene oxide with esters of lauric acid, palmitic acid, stearic acid or behenic acid, and a mixture thereof, especially those containing from 9 to 100 oxyethylene groups, such as PEG-9 to PEG-50 laurate; PEG-9 to PEG-50 palmitate; PEG-9 to PEG-50 stearate; PEG-9 to PEG-50 palmitostearate; PEG-9 to PEG-50 behenate; polyethylene glycol 100 EO monostearate; and a mixture thereof.

As glyceryl esters of fatty acids, glyceryl stearate (glyceryl mono-, di- and/or tristearate) (glyceryl stearate) or glyceryl ricinoleate and a mixture thereof can in particular be cited.

As glyceryl esters of $C_8$-$C_{24}$ alkoxylated fatty acids, polyethoxylated glyceryl stearate (glyceryl mono-, di- and/or tristearate) such as PEG-20 glyceryl stearate can for example be cited.

Mixtures of these surfactants, such as for example the product containing glyceryl stearate and PEG-100 stearate, marketed under the name ARLACEL 165 by Croda, and a product containing glyceryl stearate (glyceryl mono- and distearate) and potassium stearate, can also be used.

The sorbitol esters of $C_8$-$C_{24}$ fatty acids and alkoxylated derivatives thereof can be selected from sorbitan palmitate, sorbitan trioleate and esters of fatty acids and alkoxylated sorbitan containing for example from 20 to 100 EO, such as for example polyethylene sorbitan trioleate (polysorbate 85) or the compounds marketed under the trade names Tween 20 or Tween 60 by Croda.

As esters of fatty acids and glucose or alkylglucose, in particular glucose palmitate, alkylglucose sesquistearates such as methylglucose sesquistearate, alkylglucose palmitates such as methylglucose or ethylglucose palmitate, methylglucoside fatty esters and more specifically the diester of methylglucoside and oleic acid (Methyl glucose dioleate), the mixed ester of methylglucoside and the mixture oleic acid/hydroxystearic acid (Methyl glucose dioleate/hydroxystearate), the ester of methylglucoside and isostearic acid (Methyl glucose isostearate), the ester of methylglucoside and lauric acid (Methyl glucose laurate), the mixture of monoester and diester of methylglucoside and isostearic acid (Methyl glucose sesqui-isostearate), the mixture of monoester and diester of methylglucoside and stearic acid (Methyl glucose sesquistearate) and in particular the product marketed under the name Glucate SS by Lubrizol, and a mixture thereof can be cited.

As ethoxylated ethers of fatty acids and glucose or alkylglucose, ethoxylated ethers of fatty acids and methylglucose, and in particular the polyethylene glycol ether of the diester of methylglucoside and stearic acid with about 20 moles of ethylene oxide (PEG-20 methyl glucose distearate) such as the product marketed under the name GLUCAM E-20 DISTEARATE by Lubrizol, the polyethylene glycol ether of the mixture of monoester and diester of methylglucoside and stearic acid with about 20 moles of ethylene oxide (PEG-20 methyl glucose sesquistearate) and in particular the product marketed under the name GLUCAMATE SSE-20 by Lubrizol, and a mixture thereof, can for example be cited.

As sucrose esters, saccharose palmito-stearate, saccharose stearate and saccharose monolaurate can for example be cited.

As sugar ethers, alkylpolyglucosides can be used, and for example decylglucoside such as the product marketed under the name MYDOL 10 by Kao Chemicals, the product marketed under the name PLATAREN 2000 by BASF, and the product marketed under the name ORAMIX NS 10 by Seppic, caprylyl/capryl glucoside such as the product marketed under the name ORAMIX CG 110 by Seppic or under the name LUTENSOL GD 70 by BASF, laurylglucoside such as the products marketed under the names PLANTAREN 1200 N and PLANTACARE 1200 by BASF, cocoglucoside such as the product marketed under the name PLANTACARE 818/UP by BASF, cetostearyl glucoside possibly mixed with cetostearyl alcohol, marketed for example under the name MONTANOV 68 by Seppic, under the name TEGO-CARE CG90 by Evonik, arachidyl glucoside, for example in the form of the mixture of arachidyl and behenyl alcohols and arachidyl glucoside marketed under the name MONTANOV 202 by Seppic, cocoylethylglucoside, for example in the form of the mixture (35/65) with cetyl and stearyl alcohols, marketed under the name MONTANOV 82 by Seppic, and a mixture thereof can in particular be cited.

Mixtures of glycerides of alkoxylated plant oils such as mixtures of ethoxylated (200 EO) palm and copra (7 EO) glycerides can also be cited.

The nonionic surfactant may be selected from the group consisting of PEG-7 glyceryl cocoate, PEG-20 methylglucoside sesquistearate, PEG-20 glyceryl tri-isostearate, PG-5 dioleate, PG-4 diisostearate, PG-10 isostearate, PEG-8 isostearate, and PEG-60 hydrogenated castor oil.

Mixtures of these oxyethylenated derivatives of fatty alcohols and of fatty esters may also be used.

In some case, the nonionic surfactant is a fatty alkanolamide. Non-limiting examples of fatty alkanolamides that may be used include cocamide MEA, cocamide DEA, soyamide DEA, lauramide DEA, oleamide MIPA, stearamide MEA, myristamide DEA, stearamide DEA, oleylamide DEA, tallowamide DEA lauramide MIPA, tallowamide MEA, isostearamide DEA, isostearamide MEA, and a mixture thereof.

Thickening Agents

Thickening agents that may be mentioned include the following:

a. Carboxylic acid or carboxylate based homopolymer or co-polymer, which can be linear or crosslinked: These polymers contain one or more monomers derived from acrylic acid, substituted acrylic acids, and salts and esters of these acrylic acids (acrylates) and the substituted acrylic acids. Commercially available polymers include those sold under the trade names CARBOPOL, ACRYSOL, POLYGEL, SOKALAN, CARBOPOL ULTREZ, and POLYGEL. Examples of commercially available carboxylic acid polymers include the carbomers, which are homopolymers of acrylic acid crosslinked with allyl ethers of sucrose or pentaerytritol. The carbomers are available as the CARBOPOL 900 series from B.F. Goodrich (e.g., CARBOPOL 954). In addition, other suitable carboxylic acid polymeric agents include ULTREZ 10 (B.F. Goodrich) and copolymers of C10-30 alkyl acrylates with one or more monomers of acrylic acid, methacrylic acid, or one of their short chain (i.e., C1-4 alcohol) esters, wherein the crosslinking agent is an allyl ether of sucrose or pentaerytritol. These copolymers are known as acrylates/C10-C30 alkyl acrylate crosspolymers and are commercially available as CARBOPOL 1342, CARBOPOL 1382, PEMULEN TR-1, and PEMULEN TR-2, from B.F. Goodrich.

Other suitable carboxylic acid or carboxylate polymeric agents include copolymers of acrylic acid and alkyl C5-C10 acrylate, copolymers of acrylic acid and maleic anhydride, and polyacrylate crosspolymer-6. Polyacrylate Crosspolymer-6 is available in the raw material known as SEPIMAX ZEN from Seppic.

Another suitable carboxylic acid or carboxylate polymeric agent includes acrylamidopropyltrimonium chloride/acrylates copolymer, a cationic acrylates copolymer (or a quaternary ammonium compound), available as a raw material known under the tradename of SIMULQUAT HC 305 from Seppic.

In certain embodiments, the carboxylic acid or carboxylate polymer thickeners useful herein are those selected from carbomers, acrylates/C10-C30 alkyl acrylate crosspolymers, polyacrylate crosspolymer-6, acrylamidopropyltrimonium chloride/acrylates copolymer, and mixtures thereof.

b. Celluloses: Non-limiting examples of celluloses include cellulose, carboxymethyl hydroxyethylcellulose, cellulose acetate propionate carboxylate, hydroxyethylcellulose, hydroxyethyl ethylcellulose, hydroxypropylcellulose, hydroxypropyl methylcellulose, methyl hydroxyethylcellulose, microcrystalline cellulose, sodium cellulose sulfate, and mixtures thereof. In some instances, the cellulose is selected from water soluble cellulose derivatives (for example, carboxymethyl cellulose, methyl cellulose, methylhydroxypropyl cellulose, hydroxyethyl cellulose, hydroxypropyl cellulose, cellulose sulfate sodium salt). Furthermore, in some instance, the cellulose is preferably hydroxypropylcellulose (HPC).

c. Polyvinylpyrrolidone (PVP) and co-polymers: Non-limiting examples include Polyvinylpyrrolidone (PVP), Polyvinylpyrrolidone (PVP)/vinyl acetate copolymer (PVP/VA copolymer), polyvinylpyrrolidone (PVP)/eicosene copolymer, PVP/hexadecene copolymer, etc. Commercially available polyvinylpyrrolidone includes LUVISKOL K30, K85, K90 available from BASF. Commerically available copolymers of vinylpyrrolidone and vinylacetate include LUVISKOL VA37, VA64 available from BASF; copolymers of vinylpyrrolidone, methacrylamide, and vinylimidazole (INCI: VP/Methacrylamide/Vinyl Imidazole Copolymer) is commercially available as LUVISET from BASF. In some instances, PVP and PVP/VA copolymer are preferred.

d. Sucrose esters: Non-limiting examples include sucrose palmitate, sucrose cocoate, sucrose monooctanoate, sucrose monodecanoate, sucrose mono- or dilaurate, sucrose monomyristate, sucrose mono- or dipalmitate, sucrose mono- and distearate, sucrose mono-, di- or trioleate, sucrose mono- or dilinoleate, sucrose pentaoleate, sucrose hexaoleate, sucrose heptaoleate or sucrose octooleate, and mixed esters, such as sucrose palmitate/stearate, and mixtures thereof.

e. Polyglyceryl esters: Non-limiting polyglycerol esters of fatty acids (polygylceryl esters) include those of the following formula:

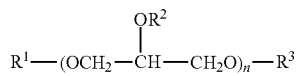

wherein n is from 2 to 20 or from 2 to 10 or from 2 to 5, or is 2, 3, 4, 5, 6, 7, 8, 9, or 10, and $R^1$, $R^2$ and $R^3$ each may independently be a fatty acid moiety or hydrogen, provided that at least one of $R^1$, $R^2$, and $R^3$ is a fatty acid moiety. For instance, $R^1$, $R^2$ and $R^3$ may be saturated or unsaturated, straight or branched, and have a length of $C_1$-$C_{40}$, $C_1$-$C_{30}$, $C_1$-$C_{25}$, or $C_1$-$C_{20}$, $C_1$-$C_{16}$, or $C_1$-$C_{10}$. Additionally, non-limiting examples of nonionic polyglycerol esters of fatty acids include polyglyceryl-4 caprylate/caprate, polyglyceryl-10 caprylate/caprate, polyglyceryl-4 caprate, polyglyceryl-10 caprate, polyglyceryl-4 laurate, polyglyceryl-5 laurate, polyglyceryl-6 laurate, polyglyceryl-10 laurate, polyglyceryl-10 cocoate, polyglyceryl-10 myristate, polyglyceryl-10 oleate, polyglyceryl-10 stearate, and mixtures thereof.

f. C8-24 hydroxyl substituted aliphatic acid and C8-24 conjugated aliphatic acid: Non-limiting examples include conjugated linoleic acid, cis-parinaric acid, trans-7-octadecenoic acid, cis-5,8,11,14,17-eicosapentanoic acid, cis-4,7,10,13,16,19-docosahexenoic acid, columbinic acid, linolenelaidic acid, ricinolaidic acid, stearidonic acid, 2-hydroxystearic acid, alpha-linolenic acid, arachidonic acid, cis-11,14-eicosadienoic acid, linolelaidic acid, monopetroselinic acid, petroselinic acid, ricinoleic acid, trans-vaccenic acid, cis-11,14,17-eicosatrienoic acid, cis-5-eicosenoic acid, cis-8,11,14-eicosatrienoic acid, hexadecatrienoic acid, palmitoleic acid, petroselaidic acid, trans trans farnesol, cis-13,16-docosadienoic acid, cis-vaccenic acid, cis-11-eicosenoic acid, cis-13,16,19-docosatrienoic acid, cis-13-octadecenoic acid, cis-15-octadecanoic acid, cis-7,10,13,16 docosatetraenoic acid, elaidic acid, gamma-linolenic acid, geranic acid, geranyl geranoic acid, linoleic acid, oleic acid, pinolenic acid, trans-13-octadecenoic acid. More preferably, the aliphatic acid comprises 12-hydroxystearic acid, conjugated linoleic acid, or a mixture thereof.

g. Gums: Non-limiting examples of gums include gum arabic, tragacanth gum, karaya gum, guar gum, gellan gum, tara gum, locust bean gum, tamarind gum, xanthan gum, locust bean gum, Seneca gum, sclerotium gum, gellan gum, etc.

Various changes can be made in the above-described compositions and methods without departing from the scope of the invention. Accordingly, it is intended that all disclosure contained in the above description and in the examples given below, shall be interpreted as illustrative and not in a limiting sense.

Example 1

Reducing Compositions

| | | | A | B | C | D wt. % | E | F | G |
|---|---|---|---|---|---|---|---|---|---|
| (a) | Sulfur-Containing Reducing Agent | AMMONIUM THIOGLYCOLATE | | | | 14.0 | | | |
| | | THIOGLYCOLIC ACID | | | | | | 10 | |
| | | SODIUM METABISULFITE | | 20 | 10 | | | | |
| | | SODIUM SULFITE | 10 | | | | | | |
| | | THIOLACTIC ACID | | | | | 10 | | |
| | | CALCIUM THIOGLYCOLATE | | | | | | | 5 |

-continued

|   |   |   | A | B | C | D wt. % | E | F | G |
|---|---|---|---|---|---|---|---|---|---|
| (c) | Anionic Surfactant | SODIUM LAURYL SULFATE |  | 1.45 | 1.45 | 1.45 | 1.45 |  |  |
|   |   | SODIUM LAUROYL METHYL ISETHIONATE | 1.7 |  |  |  |  | 1.7 | 1.7 |
| (d) | Thickening Agent | HYDROXYETHYL-CELLULOSE | 0.7 | 0.7 | 0.7 | 0.7 | 0.7 |  |  |
|   |   | XANTHAN GUM |  |  |  |  |  | 0.7 | 0.7 |
| (e) | pH Adjuster | CITRIC ACID | 0.5 | 0.5 | 0.5 | 0.5 | 0.5 | 0.5 | 0.5 |
| (f) | Misc. | Chelating agents, preservatives, pH adjusters, fragrances, etc. | ≤5 | ≤5 | ≤5 | ≤5 | ≤5 | ≤5 | ≤5 |
| (b) |   | WATER | 87 | 77.4 | 87.4 | 83.2 | 87.4 | 87 | 92 |

Example 2

Alkalizing Composition

|   |   |   | X wt. % |
|---|---|---|---|
| (a) | Organic Alkalizing Agent | MONOETHANOLAMINE (MEA) | 10 |
| (b) | Water | WATER | QS 100 |
| (c) | Miscellaneous | Chelating agents, preservatives, pH adjusters, fragrances, etc. | ≤5 |

Example 3

Testing

Testing was carried out to investigate color removal from artificially colored hair using a reducing composition, an alkalizing composition, and both a reducing composition and an alkalizing composition. Two types of hair swatches were used in the testing: (1) 90% grey natural hair swatches; and (2) 90% grey permed hair swatches. The hair swatches were colored using two commercially available oxidative coloring products, which differed in the color imparted to the hair: Ash Blue and Brown/Red.

The colored hair swatches were treated with a reducing composition of Example 1, the alkalizing composition of Example 2, or with both. Additionally, hair swatches were treated with a commercially available benchmark product designed to remove color from oxidatively colored hair. The hair swatches treated with the commercially available benchmark product served as a "treated control." Un-colored hair swatches and colored hair swatches were used as a "control" and a "colored control."

For determining the degree of change in the color of hair and/or the degree of lightening of the color or degree of color deposit on hair, colorimetric measurements of L*, a*, and b* values of the hair swatches were obtained. The L*a*b* colorimetric system is a colorimetric system that assigns each color to a position in a spherical color space. In this color space, the brightness is represented by a position in the ordinate (z-axis) direction, the hue is represented by a position in the circumferential direction, and the chroma is represented by a distance from the center axis. The position on the ordinate (z-axis) representing brightness is designated by L*, and the L* value changes from 0 corresponding to black to 100 corresponding to white. The positive direction of the x-axis corresponds to a red direction, the positive direction of the y-axis corresponds to a yellow direction, the negative direction of the x-axis corresponds to a green direction, the negative direction of the y-axis corresponds to a blue direction, and the position on the x-axis is designated by a* of which value changes from −60 to +60 and the position on the y-axis is designated by b* of which value changes from −60 to +60. The hue and chroma are represented by a* value and b* value, respectively.

Thus, the greater the value of L*, the lighter or less intense is the color of the hair. Conversely, the lower the value of L*, the darker or more intense is the color of the hair (this can also indicate greater color deposit when the hair is colored or dyed). The a* value (green/red color axis) and b* value (blue/yellow color axis) represent hue and chroma, respectively. The higher the a*, the more the hue shifts to red (i.e., the hair is redder); and the lower the b*, the more the chroma value shifts to blue.

The results of the testing are presented in the following tables.

| Color Removal (Ash Blue) - Reducing Step Only (90% Grey Natural Hair) (FIG. 1) | | | |
|---|---|---|---|
|   | L | A | B |
| 90% Natural Grey Control | 62.50 | 2.96 | 20.75 |
| Colored Control | 6.49 | 1.37 | 0.03 |
| Benchmark Control | 7.50 | 2.32 | 0.92 |
| C | 26.88 | 7.48 | 19.73 |
| B | 31.96 | 6.54 | 24.87 |
| D | 10.30 | 3.52 | −1.73 |
| E | 35.75 | 7.32 | 22.63 |
| F | 47.65 | 13.82 | 19.98 |
| G | 10.75 | 4.68 | 2.36 |

| Color Removal (Ash Blue) - Reducing Step & Alkalizing Step (90% Grey Natural Hair) (FIG. 2) | | | |
|---|---|---|---|
|   | L | A | B |
| 90% Natural Grey Control | 62.50 | 2.96 | 20.75 |
| Colored Control | 6.49 | 1.37 | 0.03 |
| Benchmark Control | 7.50 | 2.32 | 0.92 |
| C | 34.04 | 4.25 | 15.19 |
| B | 34.94 | 3.87 | 18.98 |
| D | 20.59 | 5.04 | 5.18 |
| E | 34.36 | 3.76 | 12.58 |

Figure 2:
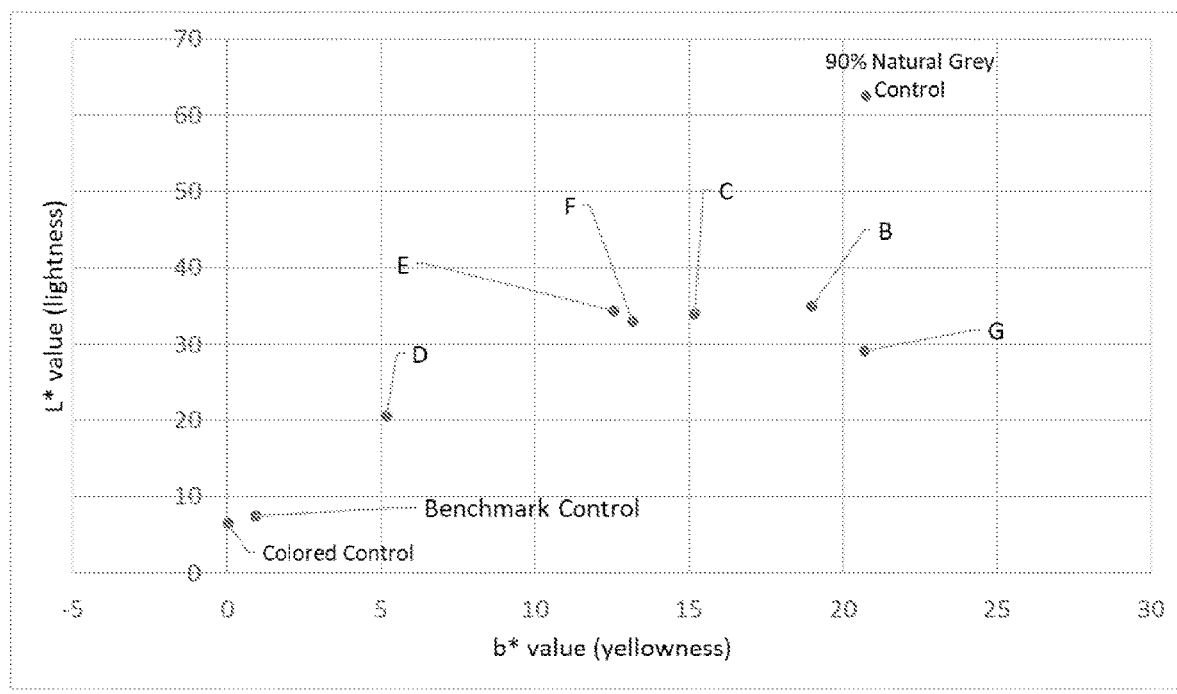
FIG. 2 is a graph showing L* versus b* values for 90% grey hair that was colored and subsequently treated with a reducing composition and an alkalizing composition.

Color Removal (Ash Blue) - Reducing Step & Alkalizing Step
(90% Grey Natural Hair) (FIG. 2)

|   | L | A | B |
|---|---|---|---|
| F | 33.01 | 5.15 | 13.17 |
| G | 29.08 | 9.08 | 20.69 |

Color Removal (Ash Blue) - Alkalizing Step & Reducing Step
(90% Grey Natural Hair)

|   | L | A | B |
|---|---|---|---|
| 90% Natural Grey Control | 62.50 | 2.96 | 20.75 |
| Colored Control | 6.49 | 1.37 | 0.03 |
| Benchmark Control | 7.50 | 2.32 | 0.92 |
| C | 40.99 | 7.72 | 26.73 |
| G | 12.88 | 5.41 | 2.40 |

Figure 3:
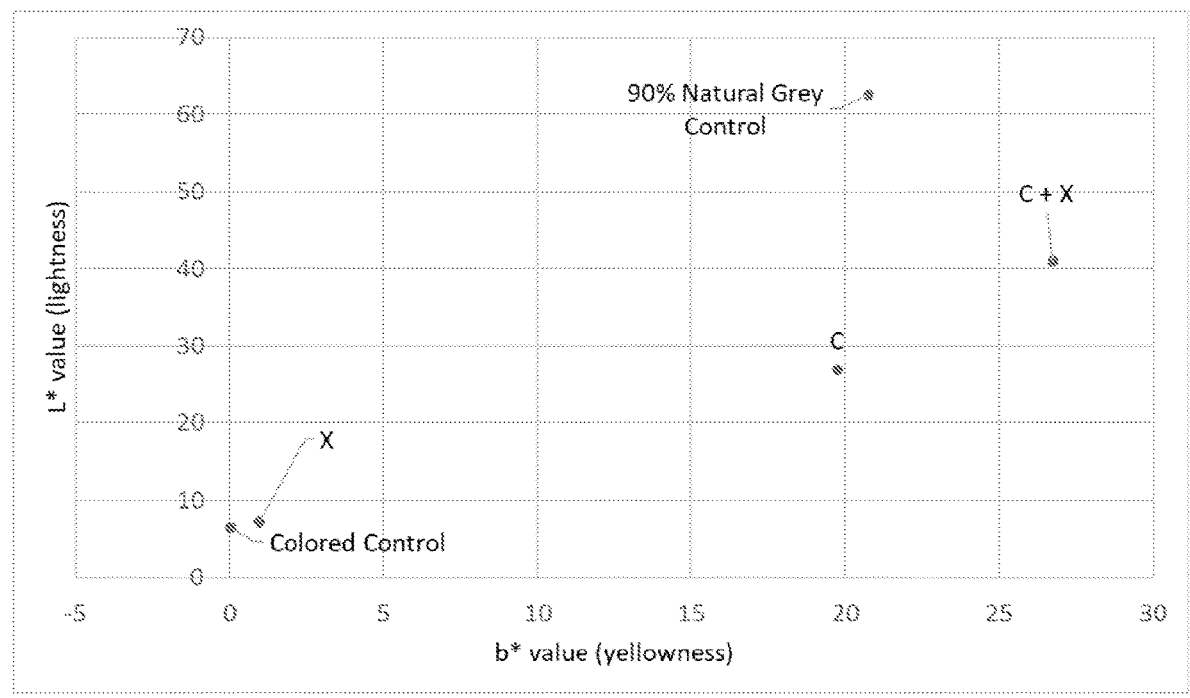
FIG. 3 is a graph showing L* versus b* values for 90% grey hair that was colored and subsequently treated with a reducing composition, an alkalizing composition, or both.

Color Removal (Ash Blue) - Reducing Step Only v. Alkalizing Step Only
(90% Grey Natural Hair) (FIG. 3)

|   | L | A | B |
|---|---|---|---|
| 90% Natural Grey Control | 62.50 | 2.96 | 20.75 |
| Colored Control | 6.49 | 1.37 | 0.03 |
| X | 7.21 | 1.14 | 0.96 |
| C | 26.88 | 7.48 | 19.73 |
| C + X | 40.99 | 7.72 | 26.73 |

Figure 4:
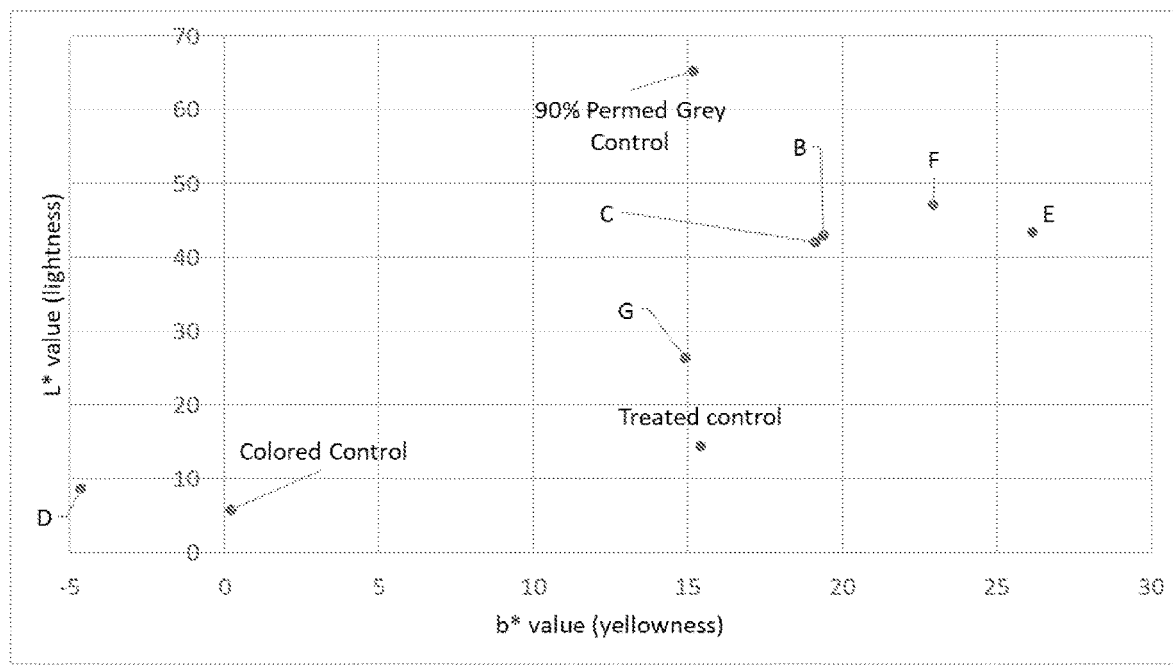
FIG. 4 is a graph showing L* versus b* values for 90% grey permed hair that was colored and subsequently treated with a reducing composition.

Color Removal (Ash Blue) - Reducing Step Only
(90% Grey Permed Hair) (FIG. 4)

|   | L | A | B |
|---|---|---|---|
| 90% Permed Grey Control | 65.28 | 1.39 | 15.17 |
| Colored Control | 5.90 | 1.64 | 0.20 |
| Treated control | 14.53 | 24.62 | 15.41 |
| C | 42.18 | 7.98 | 19.12 |
| B | 43.02 | 8.73 | 19.37 |
| D | 8.75 | 4.49 | −4.65 |
| E | 43.47 | 11.09 | 26.15 |
| F | 47.16 | 9.55 | 22.96 |
| G | 26.46 | 5.64 | 14.92 |

Figure 5:
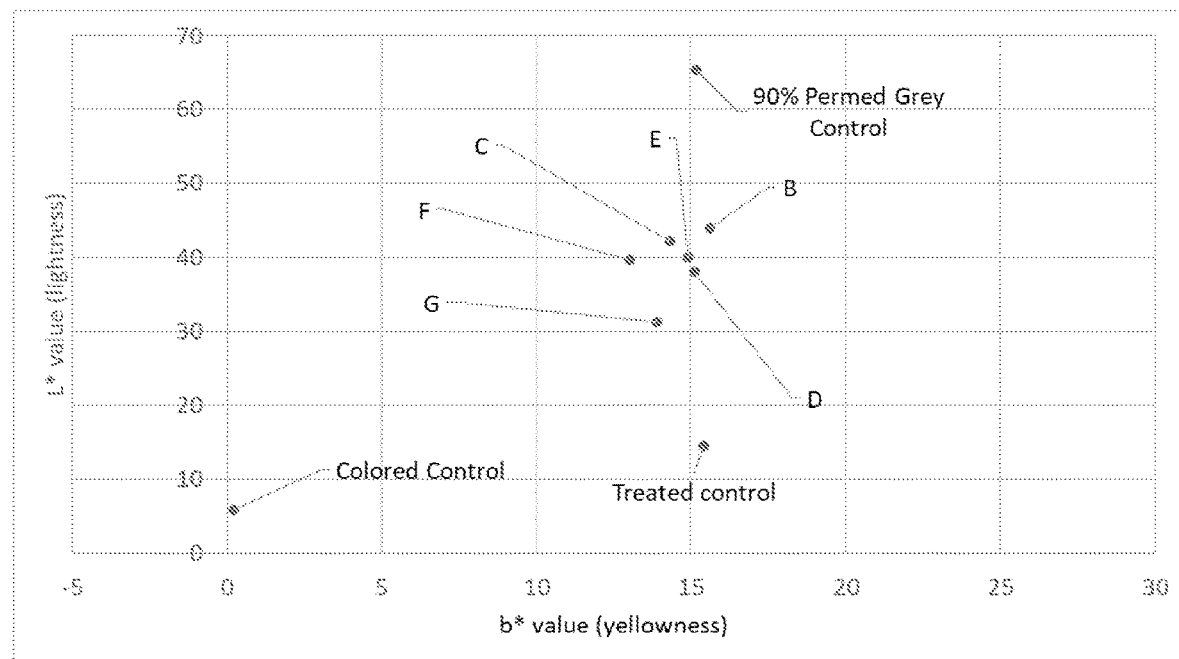
FIG. 5 is a graph showing L* versus b* values for 90% grey permed hair that was colored and subsequently treated with a reducing composition and an alkalizing composition.

Color Removal (Ash Blue) - Reducing Step & Alkalizing Step
(90% Grey Permed Hair) (FIG. 5)

|   | L | A | B |
|---|---|---|---|
| 90% Permed Grey Control | 65.28 | 1.39 | 15.17 |
| Colored Control | 5.90 | 1.64 | 0.20 |
| Treated control | 14.53 | 24.62 | 15.41 |
| C | 42.18 | 4.60 | 14.33 |
| B | 43.98 | 4.01 | 15.60 |
| D | 38.01 | 3.59 | 15.10 |
| E | 40.03 | 2.21 | 14.91 |
| F | 39.71 | 3.18 | 13.03 |
| G | 31.29 | 5.68 | 13.90 |

Color Removal (Ash Blue) - Alkalizing Step & Reducing Step
(90% Grey Permed Hair)

|   | L | A | B |
|---|---|---|---|
| 90% Permed Grey Control | 65.28 | 1.39 | 15.17 |
| Colored Control | 5.90 | 1.64 | 0.20 |
| Treated control | 14.53 | 24.62 | 15.41 |
| C | 44.30 | 8.69 | 18.03 |
| G | 16.40 | 5.48 | 4.02 |

Figure 6:
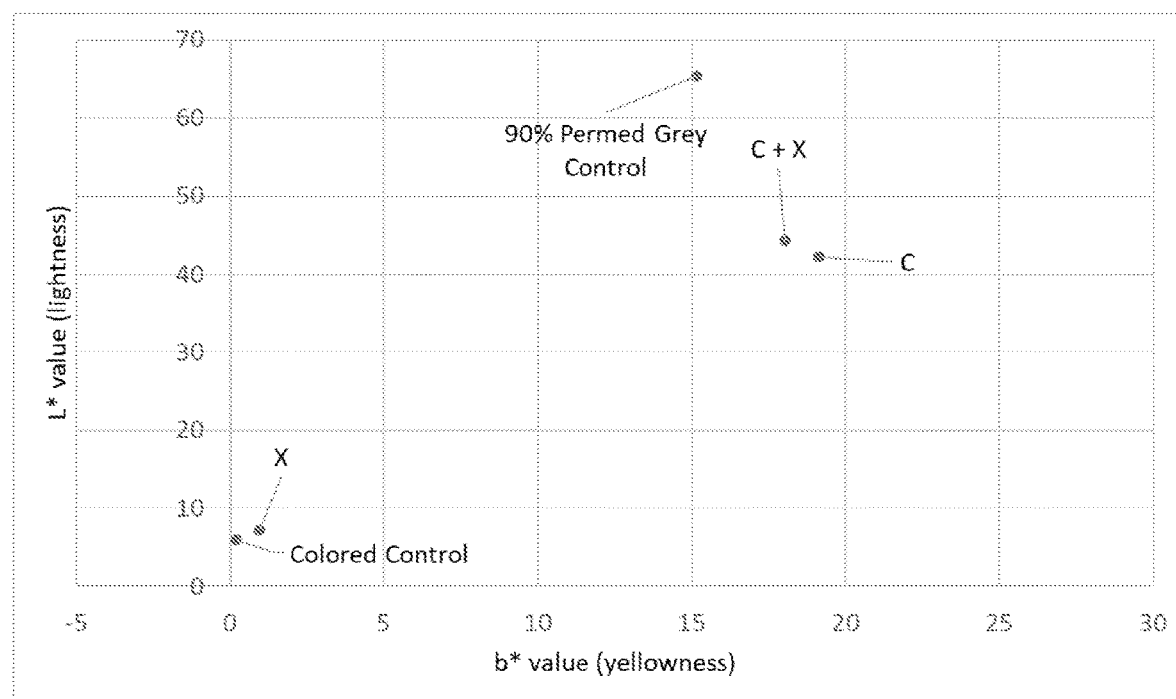
FIG. 6 is a graph showing L* versus b* values for 90% grey permed hair that was colored and subsequently treated with a reducing composition, an alkalizing composition, or both.

Color Removal (Ash Blue) - Reducing Step Only v. Alkalizing Step Only
(90% Grey Permed Hair) (FIG. 6)

|   | L | A | B |
|---|---|---|---|
| 90% Permed Grey Control | 65.28 | 1.39 | 15.17 |
| Colored Control | 5.90 | 1.64 | 0.20 |
| X | 7.21 | 1.14 | 0.96 |
| C | 42.18 | 7.98 | 19.12 |
| C + X | 44.30 | 8.69 | 18.03 |

Figure 7:
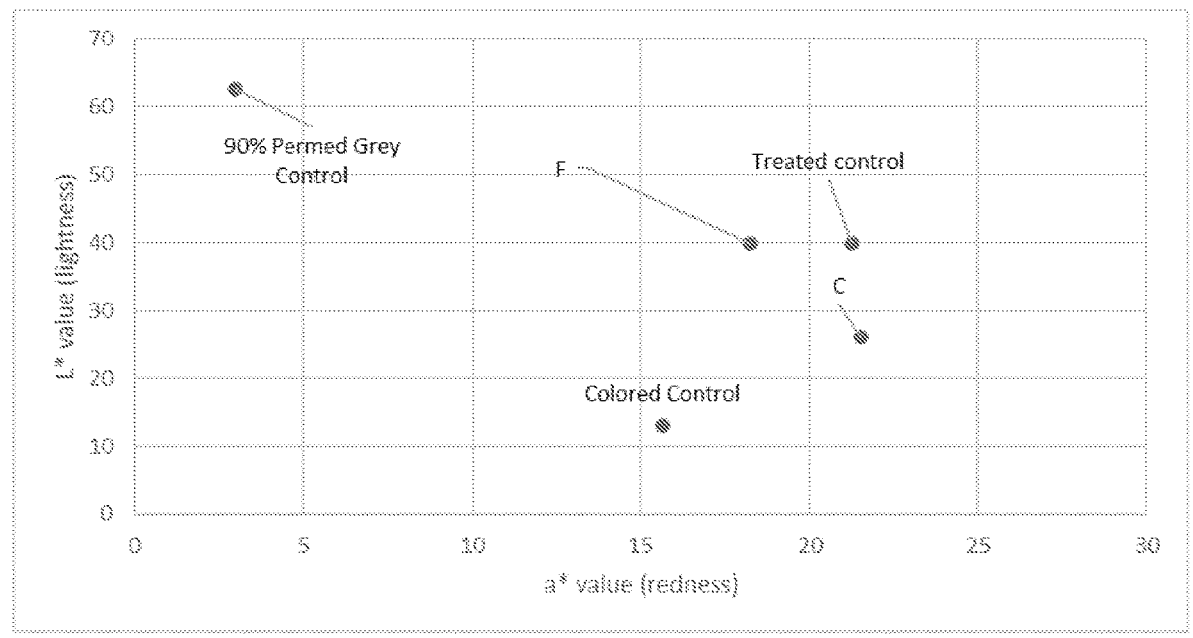
FIG. 7 is a graph showing L* versus b* values for 90% grey hair that was colored and subsequently treated with a reducing composition.

L* vs. b* Color Removal (Brown/Red) - Reducing Step Only
(90% Grey Natural Hair) (FIG. 7)

|   | L | A | B |
|---|---|---|---|
| 90% Permed Grey Control | 62.50 | 2.96 | 20.75 |
| Colored Control | 12.97 | 15.65 | 8.27 |
| Treated control | 39.81 | 21.24 | 44.22 |
| C | 26.11 | 21.54 | 22.49 |
| F | 39.93 | 18.25 | 34.02 |

Figure 8:
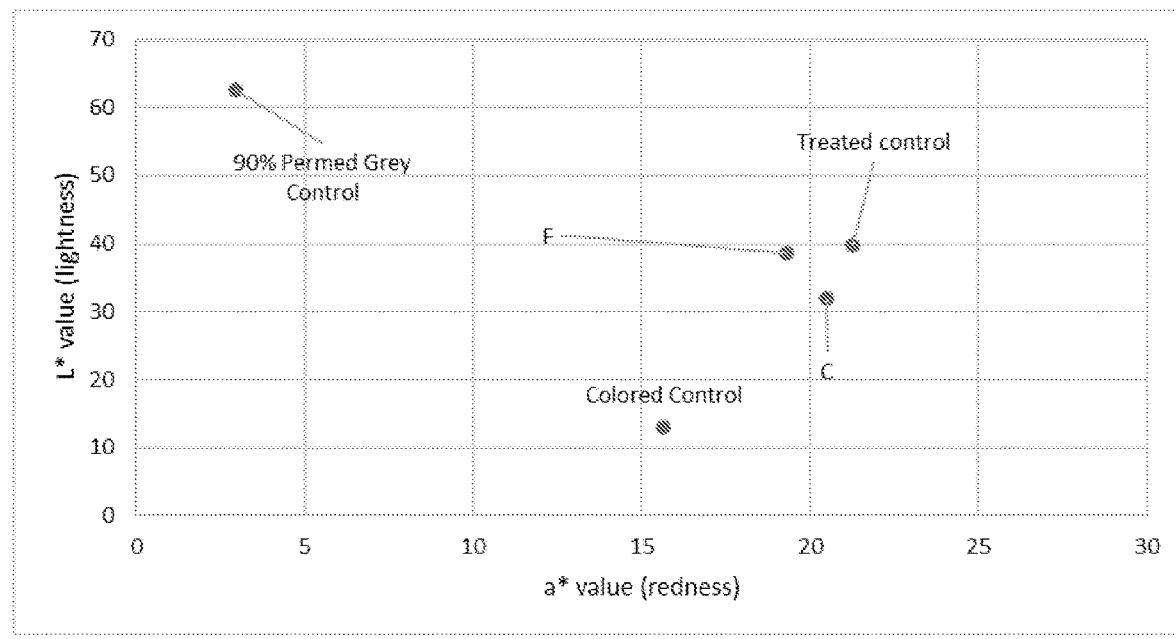
FIG. 8 is a graph showing L* versus b* values for 90% grey hair that was colored and subsequently treated with a reducing composition and an alkalizing composition.

L* vs. b* Color Removal (Brown/Red) - Reducing Step & Alkalizing Step
(90% Grey Natural Hair) (FIG. 8)

|   | L | A | B |
|---|---|---|---|
| 90% Permed Grey Control | 62.50 | 2.96 | 20.75 |
| Colored Control | 12.97 | 15.65 | 8.27 |
| Treated control | 39.81 | 21.24 | 44.22 |
| C | 31.88 | 20.48 | 26.53 |
| F | 38.59 | 19.31 | 31.92 |

Figure 9:
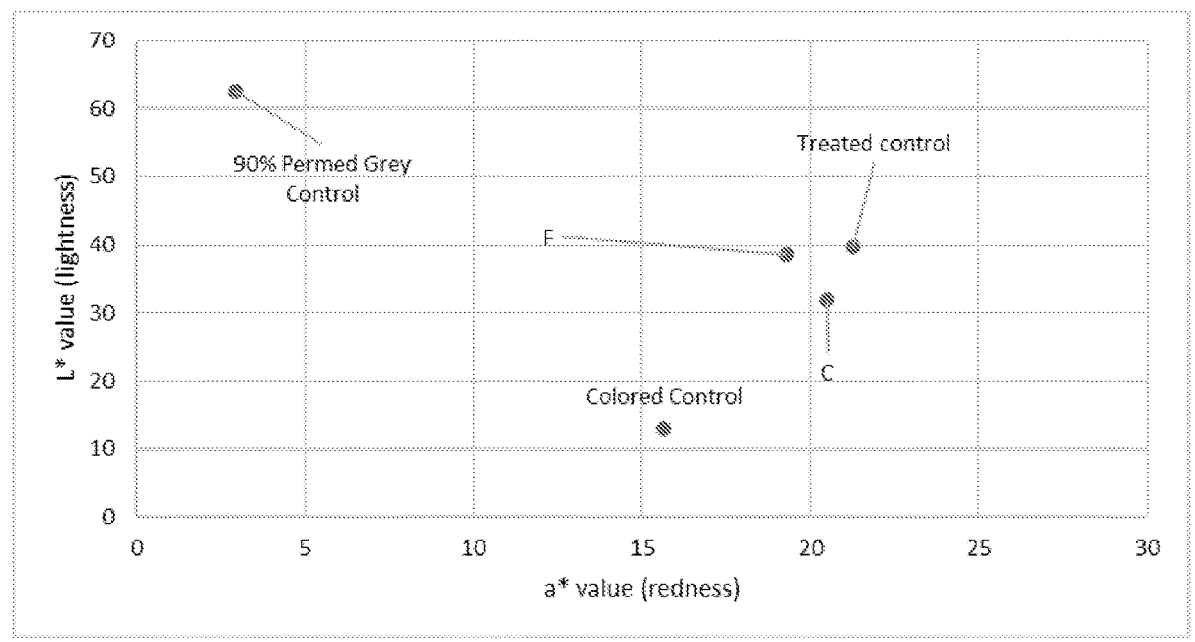
FIG. 9 is a graph showing L* versus b* values for 90% grey hair that was colored and subsequently treated with a reducing composition, an alkalizing composition, or both.

L* vs. b* Color Removal (Brown/Red) -
Reducing Step Only v. Alkalizing Step Only
(90% Grey Natural Hair) (FIG. 9)

|   | L | A | B |
|---|---|---|---|
| 90% Permed Grey Control | 62.50 | 2.96 | 20.75 |
| Colored Control | 12.97 | 15.65 | 8.27 |
| X | 15.56 | 15.90 | 9.72 |
| C | 26.11 | 21.54 | 22.49 |
| X + C | 31.88 | 50.48 | 26.53 |

Figure 10:
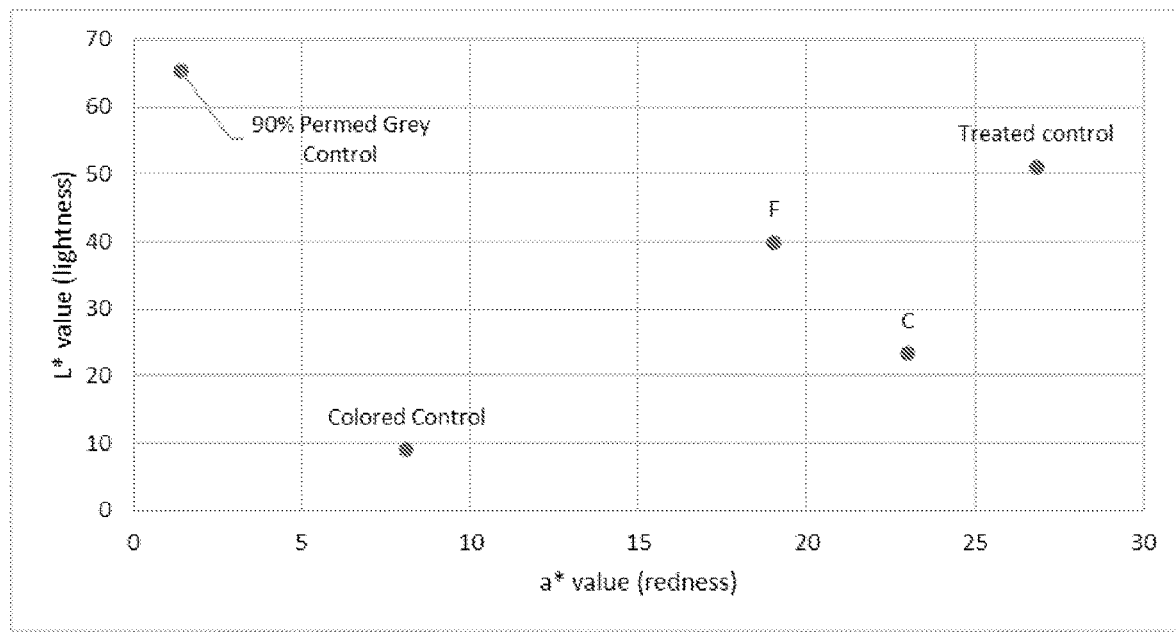
FIG. 10 is a graph showing L* versus b* values for 90% grey permed hair that was colored and subsequently treated with a reducing composition.

L* vs. b* Color Removal (Brown/Red) - Reducing Step Only
(90% Grey Permed Hair) (FIG. 10)

|   | L | A | B |
|---|---|---|---|
| 90% Permed Grey Control | 65.28 | 1.39 | 15.17 |
| Colored Control | 9.02 | 8.12 | 3.62 |
| Treated control | 51.09 | 26.82 | 57.77 |

-continued

L* vs. b* Color Removal (Brown/Red) - Reducing Step Only
(90% Grey Permed Hair) (FIG. 10)

|   | L | A | B |
|---|---|---|---|
| C | 23.33 | 23.01 | 20.51 |
| F | 39.86 | 19.03 | 33.22 |

Figure 11:
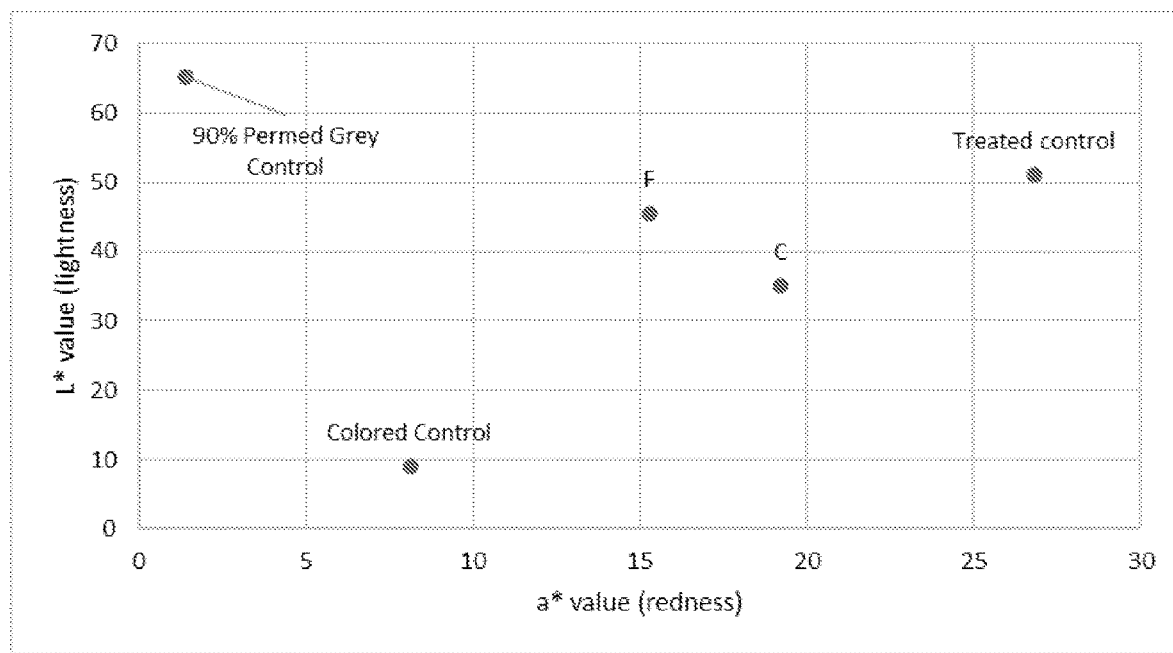
FIG. 11 is a graph showing L* versus b* values for 90% grey permed hair that was colored and subsequently treated with a reducing composition and an alkalizing composition.

L* vs. b* Color Removal (Brown/Red) - Reducing Step & Alkalizing Step
(90% Grey Permed Hair) (FIG. 11)

|   | L | A | B |
|---|---|---|---|
| 90% Permed Grey Control | 65.28 | 1.39 | 15.17 |
| Colored Control | 9.02 | 8.12 | 3.62 |
| Treated control | 51.09 | 26.82 | 57.77 |
| C | 35.00 | 19.20 | 25.32 |
| F | 45.53 | 15.32 | 32.58 |

Figure 12:
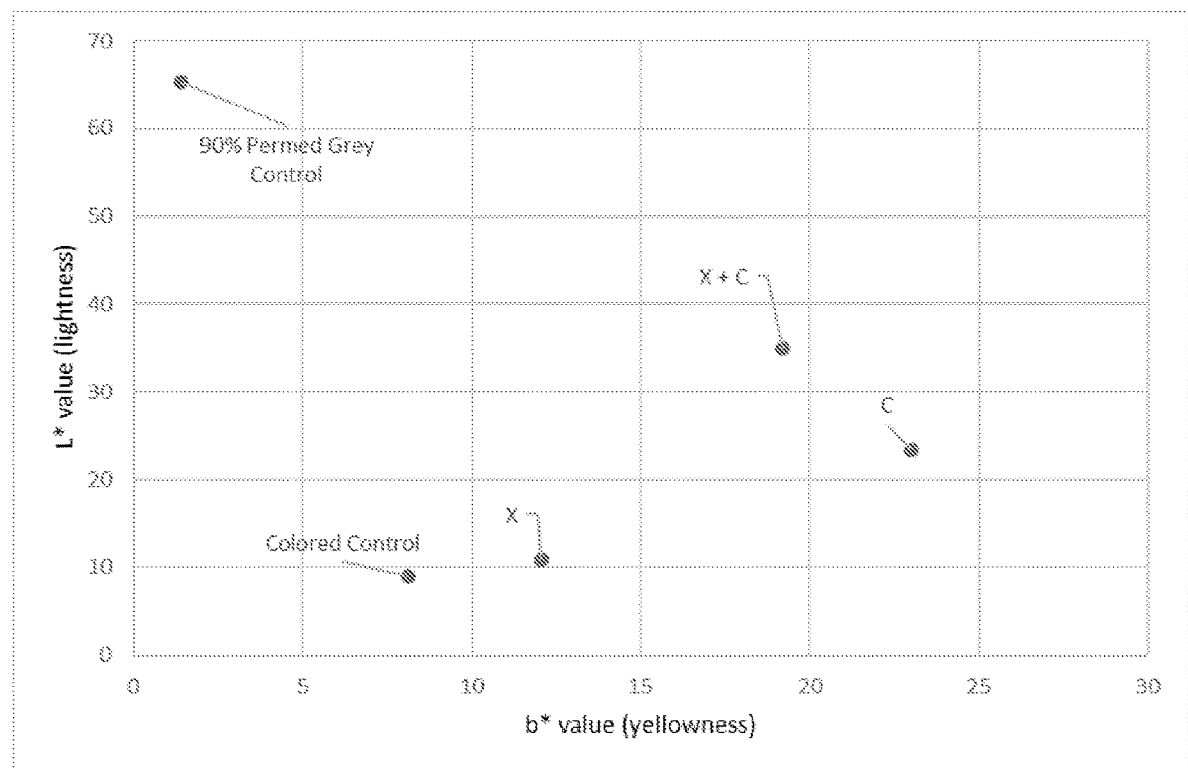
FIG. 12 is a graph showing L* versus b* values for 90% grey permed hair that was colored and subsequently treated with a reducing composition, an alkalizing composition, or both.

L* vs. b* Color Removal (Brown/Red) -
Reducing Step Only v. Alkalizing Step Only
(90% Grey Permed Hair) (FIG. 12)

|   | L | A | B |
|---|---|---|---|
| 90% Permed Grey Control | 65.28 | 1.39 | 15.17 |
| Colored Control | 9.02 | 8.12 | 3.62 |
| X | 10.81775 | 12.04352 | 5.806676 |
| C | 23.33 | 23.01 | 20.51 |
| X + C | 35.00 | 19.20 | 25.32 |

The results show that when a reducing composition is used in conjunction with an alkalizing composition, artificial color is removed to a surprising degree. The results surprisingly show that the combination of treatments is better than each individual treatment used alone and is better than a commercially available commercial product specifically designed to remove color from artificially colored hair.

Definitions

The term "hair" as used herein includes hair of the head, beard hair, mustache hair, eyebrow hair, eyelashes, and body hair, unless otherwise specified.

As used herein, the terms "comprising," "having," and "including" are used in their open, non-limiting sense.

"Oil" is used herein to refer to an organic compound insoluble in water at normal temperature (25° C.) and at atmospheric pressure (760 mmHg), i.e. it has a water solubility of less than 5% by weight, or less than 1% by weight, or less than 0.1% by weight. Oils have in their structure a chain of at least two siloxane groups or at least one hydrocarbon chain having at least 6 carbon atoms. Furthermore, oils are generally soluble in organic solvents in the same conditions of temperature and pressure, for example in chloroform, ethanol, benzene or decamethylcyclopentasiloxane. Furthermore, oils are liquid at ordinary temperature (25° C.) and at atmospheric pressure (760 mmHg). The oils preferably do not contain any carboxylic acid functions, i.e. they do not contain any —COOH or —COO— groups. As described throughout the disclosure fatty alcohols are independent from fatty compounds and oils, i.e., even if a fatty alcohol is present in the compositions of the instant disclosure, the compositions may nonetheless be free or essentially free from fatty compounds of oils (because fatty alcohols are not included in the definition of fatty compounds and oils).

The term "transparent" with respect to a transparent composition indicates that the composition has transmittance of at least 80% at a wavelength of 600 nm, for example measured using a Lambda 40 UV-visible spectrometer. The compositions may have, for example, a transmittance of at least 80%, at least 90%, or at least 95% at a wavelength of 600 nm, measured, for example, using a Lambda 40 UV-visible spectrometer. The term "clear" is interchangeable with the term "transparent" for purposes of the instant disclosure. A human can typically see through a transparent composition, for example, and read the text on the other side of a clear glass or clear plastic bottle containing the composition.

The term "translucent" with respect to a translucent composition indicates that the composition has a transmittance of at least 50% at a wavelength of 600 nm, for example measured using a Lambda 40 UV-visible spectrometer. A human cannot likely see through a translucent composition, for example, and read the text on the other side of a clear glass or clear plastic bottle containing the composition. Rather, the text is usually blurred and difficult or not possible to read, yet movement and structure can normally be identified.

An "opaque" composition is a composition that is not transparent or translucent.

In the context of the instant disclosure, a "composition colorant" is a compound that colors the composition but does not have an appreciable coloring effect on hair. In other words, the composition colorant is included to provide a coloring to the composition for aesthetic appeal, which is not intended to impart coloring properties to hair. Styling gels, for example, can be found in a variety of different colors (e.g., light blue, light pink, etc.) yet application of the styling gel to the hair does not change the color of the hair.

The terms "a," "an," and "the" are understood to encompass the plural as well as the singular. Thus, the term "a mixture thereof" also relates to "mixtures thereof." Throughout the disclosure, the term "a mixture thereof" is used, following a list of elements as shown in the following example where letters A-F represent the elements: "one or more elements selected from the group consisting of A, B, C, D, E, F, and a mixture thereof." The term, "a mixture thereof" does not require that the mixture include all of A, B, C, D, E, and F (although all of A, B, C, D, E, and F may be included). Rather, it indicates that a mixture of any two or more of A, B, C, D, E, and F can be included. In other words, it is equivalent to the phrase "one or more elements selected from the group consisting of A, B, C, D, E, F, and a mixture of any two or more of A, B, C, D, E, and F."

Likewise, the term "a salt thereof" also relates to "salts thereof." Thus, where the disclosure refers to "an element selected from the group consisting of A, B, C, D, E, F, a salt thereof, and a mixture thereof," it indicates that that one or more of A, B, C, D, and F may be included, one or more of a salt of A, a salt of B, a salt of C, a salt of D, a salt of E, and a salt of F may be include, or a mixture of any two of A, B, C, D, E, F, a salt of A, a salt of B, a salt of C, a salt of D, a salt of E, and a salt of F may be included.

The expression "one or more" means "at least one" and thus includes individual components as well as mixtures/combinations.

Other than in the operating examples, or where otherwise indicated, all numbers expressing quantities of ingredients and/or reaction conditions may be modified in all instances by the term "about," meaning within +/−5% of the indicated number.

Some of the various categories of components identified may overlap. In such cases where overlap may exist and the composition includes both components (or the composition includes more than two components that overlap), an overlapping compound does not represent more than one component. For example, a fatty acid may be considered both an emulsifier and a fatty compound. If a particular composition includes both an emulsifier and a fatty compound, a single fatty acid will serve as only the emulsifier or only the fatty compound (the single fatty acid does not serve as both the emulsifier and the fatty component).

The salts referred to throughout the disclosure may include salts having a counter-ion such as an alkali metal, alkaline earth metal, or ammonium counter-ion. This list of counter-ions, however, is non-limiting.

The term "treat" (and its grammatical variations) as used herein refers to the application of the compositions of the present disclosure onto the surface of keratinous substrates such as hair.

As used herein, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc. All ranges and values disclosed herein are inclusive and combinable. For examples, any value or point described herein that falls within a range described herein can serve as a minimum or maximum value to derive a sub-range, etc.

All components positively set forth throughout the instant disclosure may be negatively excluded from the claims, e.g., a claimed composition may be "free," "essentially free" (or "substantially free") of one or more components that are positively set forth in the instant disclosure. As an example, silicones can optionally be included in the compositions but preferably the compositions are free or essentially free from silicones. Silicones are synthetic polymers made up of repeating units of siloxane, elemental silicon and oxygen, combined with other elements, most often carbon and hydrogen. Thus, silicones are also called polysiloxanes.

The term "substantially free" or "essentially free" as used herein means that there is less than about 2% by weight of a specific material added to a composition, based on the total weight of the compositions. Nonetheless, the compositions may include less than about 1 wt. %, less than about 0.5 wt. %, less than about 0.1 wt. %, or none of the specified material. All of the components set forth herein may be optionally included or excluded from the compositions/method/kits. When excluded, the compositions/methods/kits may be free or essentially free of the component. For example, a particular composition may be free or essentially free of alkoxylated compounds, for example, ethoxylated thickeners and/or ethoxylated surfactants. Likewise, a particular composition may be free or essentially free of sulfates, such as sulfate surfactants.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

The invention claimed is:

1. A method for removing color from oxidatively colored hair comprising:
   (I) applying a reducing composition to hair that has been colored with oxidation dyes, the reducing composition comprising:
      (a) one or more sulfur-containing reducing agents selected from alkaline-earth metal sulfites, ammonia sulfites, thiol-based compounds, a salt thereof, and a combination thereof; and
      (b) water;
      wherein the reducing composition is free from oxidative dye precursors;
   (II) rinsing the reducing composition from the hair and optionally shampooing the hair;
   (III) applying an alkalizing composition to the hair, the alkalizing composition comprising:
      (a) about 2 to about 15 wt. % of one or more organic alkalizing agents, based on a total weight of the alkalizing composition; and
      (b) water; and
   (IV) rinsing the reducing composition from the hair and optionally shampooing the hair;
      wherein (I) and (II) can be carried out before (III) and (IV), or (III) and (IV) can be carried out before (I) and (II);
      the method removes color from the colored hair; and
      the method does not comprise treating the hair with an oxidizing agent.

2. The method of claim 1, wherein at least one of the one or more sulfur-containing reducing agents is selected from alkaline-earth metal sulfites, a salt thereof, and a combination thereof.

3. The method of claim 1, wherein at least one of the one or more sulfur-containing reducing agents is a thiol-based compound selected from thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, 2-mercaptoethanol, dithiothreitol, thiosalicylic acid, thiopropionic acid, lipoic acid, a salt thereof, and a combination thereof.

4. The method of claim 1, wherein the reducing composition comprises about 2 to about 35 wt. % of the one or more reducing agents, based on the total weight of the reducing composition.

5. The method of claim 1, wherein the reducing composition comprises about 50 to about 95 wt. % of water, based on a total weight of the reducing composition.

6. The method of claim 1, wherein the reducing composition further comprises:
   (c) one or more surfactants.

7. The method of claim 6, wherein the one or more surfactants include one or more anionic surfactants.

8. The method of claim 1, wherein the reducing composition further comprises:
   (d) one or more thickening agents.

9. The method of claim 1, wherein the one or more thickening agents are selected from polyacrylate crosspolymers, crosslinked polyacrylate polymers, cationic acrylate copolymers, anionic acrylic or carboxylic acid polymers, polyacrylamide polymers, polysaccharides, gums, polyquaterniums, vinylpyrrolidone homopolymers/copolymers, C8-24 hydroxyl substituted aliphatic acid, C8-24 conjugated aliphatic acid, sugar fatty esters, polyglyceryl esters, and a mixture thereof.

10. The method of claim 8, wherein the reducing composition comprises about 0.1 to about 5 wt. % of the one or more thickening agents, based on a total weight of the reducing composition.

11. The method of claim 1, wherein the reducing composition comprises:
   (a) about 2 to about 20 wt. % of one or more sulfur-containing reducing agents selected from alkaline-earth metal sulfites, ammonia sulfites, thiol-based compounds, salt thereof, and a combination thereof;
   (b) about 60 to about 95 wt. % of water;
   (c) about 0.5 to about 8 wt. % of one or more anionic surfactants; and
   (d) about 0.1 to about 5 wt. % of one or more thickening agents,
      wherein the weight percentages are based on a total weight of the reducing composition.

12. The method of claim 1, wherein the reducing composition remains on the hair after application to the hair in (I) for about 5 to about 60 minutes before being rinsed from the hair in (II); and the alkalizing composition remains on the hair after application to the hair (III) for about 5 to about 60 minutes before being rinsed from the hair in (IV).

13. The method of claim 1, wherein the one or more organic alkalizing agent are selected from alkanolamines.

14. The method of claim 13, wherein the alkanolamines are selected from monoethanolamine, diethanolamine, triethanolamine, monopropanolamine, dipropanolamine, tripropanolamine, 2-amino-2-methyl-1,3-propanediol, 2-amino-2-methyl-1-propanol, and 2-amino-2-hydroxymethyl-1,3-propanediol, and a combination thereof.

15. The method of claim 1, wherein the reducing composition has a pH of about 2 to about 6 and the alkalizing composition has a pH of about 9 to about 12.

16. A method for removing color from oxidatively colored hair comprising:
   (I) applying a reducing composition to the oxidatively colored hair and allowing the reducing composition to remain on the hair for about 5 to about 60 minutes at a temperature of about 15 to about 45° C., the reducing composition comprising:
      (a) about 2 to about 35 wt. %, based on a total weight of the reducing composition, of one or more sulfur-containing reducing agents selected from alkaline-earth metal sulfites, ammonia sulfites, thiol-based compounds, salt thereof, and a combination thereof;
      (b) about 60 to about 95 wt. %, based on a total weight of the reducing composition, of water;
      (c) about 0.5 to about 10 wt. %, based on a total weight of the reducing composition, of one or more anionic surfactants; and
      (d) about 0.1 to about 5 wt. %, based on a total weight of the reducing composition, of one or more natural thickening agents;
         wherein the reducing composition is free from oxidative dye precursors;
   (II) rinsing the reducing composition from the hair and optionally shampooing the hair;
   (III) applying an alkalizing composition to the hair and allowing the alkalizing composition to remain on the hair for about 1 to about 60 minutes at a temperature of about 15 to about 45° C., the alkalizing composition comprising:
      (a) about 5 to about 25 wt. %, based on a total weight of the alkalizing composition, of one or more organic alkalizing agents; and
      (b) about 50 to about 98 wt. %, based on the total weight of the alkalizing composition, of water; and
   (IV) rinsing the reducing composition from the hair and optionally shampooing the hair; and
   (V) optionally, drying and styling the hair after rinsing and optionally shampooing the hair in (IV);
      wherein (I) and (II) can be carried out before (III) and (IV), or (III) and (IV) can be carried out before (I) and (II);
      the method removes oxidative dyes from the colored hair; and
      the method does not comprise treating the hair with oxidizing agents.

17. The method of claim 16 comprising:
   (I) applying a reducing composition to the oxidatively colored hair and allowing the reducing composition to remain on the hair for about 5 to about 60 minutes at a temperature of about 15 to about 45° C., wherein the reducing composition comprises:
      (a) about 3 to about 15 wt. % of sodium metabisulfite, thiolactic acid, ammonium thioglycolate, thioglycolic acid, calcium thioglycolate, salts thereof, and a combination thereof;
      (b) about 80 to about 95 wt. % of water;
      (c) about 0.5 to about 5 wt. % of one or more anionic surfactants; and
      (d) about 0.1 to about 5 wt. % of one or more natural thickening agents;
         wherein the reducing composition is free from oxidative dye precursors;
   (II) rinsing the reducing composition from the hair and optionally shampooing the hair;
   (III) within about 60 minutes from rinsing the reducing composition from the hair in (II), applying an alkalizing composition to the hair and allowing the alkalizing composition to remain on the hair for about 1 to about 60 minutes at a temperature of about 15 to about 45° C., wherein the alkalizing composition comprises:
      (a) about 5 to about 25 wt. % of monoethanolamine; and
      (b) about 75 to about 98 wt. % of water; and
   (IV) rinsing the reducing composition from the hair and optionally shampooing the hair; and
   (V) optionally, drying and styling the hair after rinsing and optionally shampooing the hair in (IV);
      wherein (I) and (II) can be carried out before (III) and (IV), or (III) and (IV) can be carried out before (I) and (II);
      the method removes oxidative dyes from the colored hair; and
      the method does not comprise treating the hair with an oxidizing agent.

18. A kit comprising:
   (A) a reducing composition comprising:
      (a) one or more sulfur-containing reducing agents;
      (b) water;
      wherein the reducing composition is free from oxidative dye precursors; and (B) an alkalizing composition comprising:
  (a) one or more organic alkalizing agents; and
  (b) water;
    wherein the reducing composition (A) and the alkalizing composition (B) are separately contained.

* * * * *